United States Patent [19]
Lim et al.

[11] Patent Number: 5,822,998
[45] Date of Patent: Oct. 20, 1998

[54] REFRIGERATOR

[75] Inventors: Jae Hoon Lim; Yong Myoung Kim; Ki Woong Song; Seak Haeng Park, all of Suwon, Rep. of Korea

[73] Assignee: Samsung Electronics Co., Ltd., Suwon, Rep. of Korea

[21] Appl. No.: 537,789

[22] PCT Filed: Apr. 3, 1995

[86] PCT No.: PCT/KR95/00030

§ 371 Date: Oct. 23, 1995

§ 102(e) Date: Oct. 23, 1995

[87] PCT Pub. No.: WO95/27178

PCT Pub. Date: Oct. 12, 1995

[30] Foreign Application Priority Data

Apr. 4, 1994 [KR] Rep. of Korea ............... 1994 7080
Jul. 20, 1994 [KR] Rep. of Korea ............. 1994 17512
Dec. 10, 1994 [KR] Rep. of Korea ............. 1994 33558

[51] Int. Cl.⁶ .................................................. F25D 17/08
[52] U.S. Cl. .............................................. 62/186; 62/408
[58] Field of Search .......................... 62/186, 187, 407, 62/408, 409, 413, 414, 415, 416, 417

[56] References Cited

U.S. PATENT DOCUMENTS

| | | | |
|---|---|---|---|
| 2,907,186 | 10/1959 | Barroero | 62/408 |
| 5,076,070 | 12/1991 | Takushima et al. | 62/426 |
| 5,092,136 | 3/1992 | Kang | 62/408 |
| 5,214,936 | 6/1993 | Lim et al. | 62/407 |

FOREIGN PATENT DOCUMENTS 0 345 437  12/1989  European Pat. Off. .
0 419 817   4/1991  European Pat. Off. .
0 541 172   5/1993  European Pat. Off. .
4-177074    6/1992  Japan ......................................... 62/408

*Primary Examiner*—Harry B. Tanner
*Attorney, Agent, or Firm*—Burns, Doane, Swecker & Mathis, L.L.P.

[57] ABSTRACT

This invention relates to a refrigerator having an air distribution apparatus in which the temperature distribution throughout the whole volume of a compartment is maintained in uniform by evenly dispersing the evaporated cool air, and it achieves concentrated refrigeration on a specified area of the compartment requiring a special refrigeration by controlling the discharging direction and quantity of the evaporated cool air. The refrigerator comprises a body 4 partitioned into a freezing compartment 2 and a refrigerating compartment 3; an evaporator 12 disposed in the body 4; and an air distribution apparatus 17 disposed on one wall of the refrigerating compartment 3. The air distribution apparatus 17 further is comprised with a first air passage 18 for guiding the flow of the cool air generated from the evaporator 12; a second air passage 15 having a first duct 35 and a second duct 36 which are arranged in a longitudinal direction at both longitudinal edges for guiding the down-flow of the cool air through the first air passage 18; a plurality of openings 16 disposed between the first duct 35 and said second duct 36 for discharging the air along the second air passage 15 into the refrigerating compartment 3. The air distribution apparatus 17 furthermore is comprised with a plurality of openings 16 for discharging into the refrigerating compartment 3, in an up-down and right-left direction, the cool air guided by the second air passage 15 formed in a longitudinal direction; a swing-wing 26 rotatably disposed thereat for controlling the air discharging direction through the opening 16; and a driving motor 28 for rotating the swing-wing 26.

26 Claims, 20 Drawing Sheets

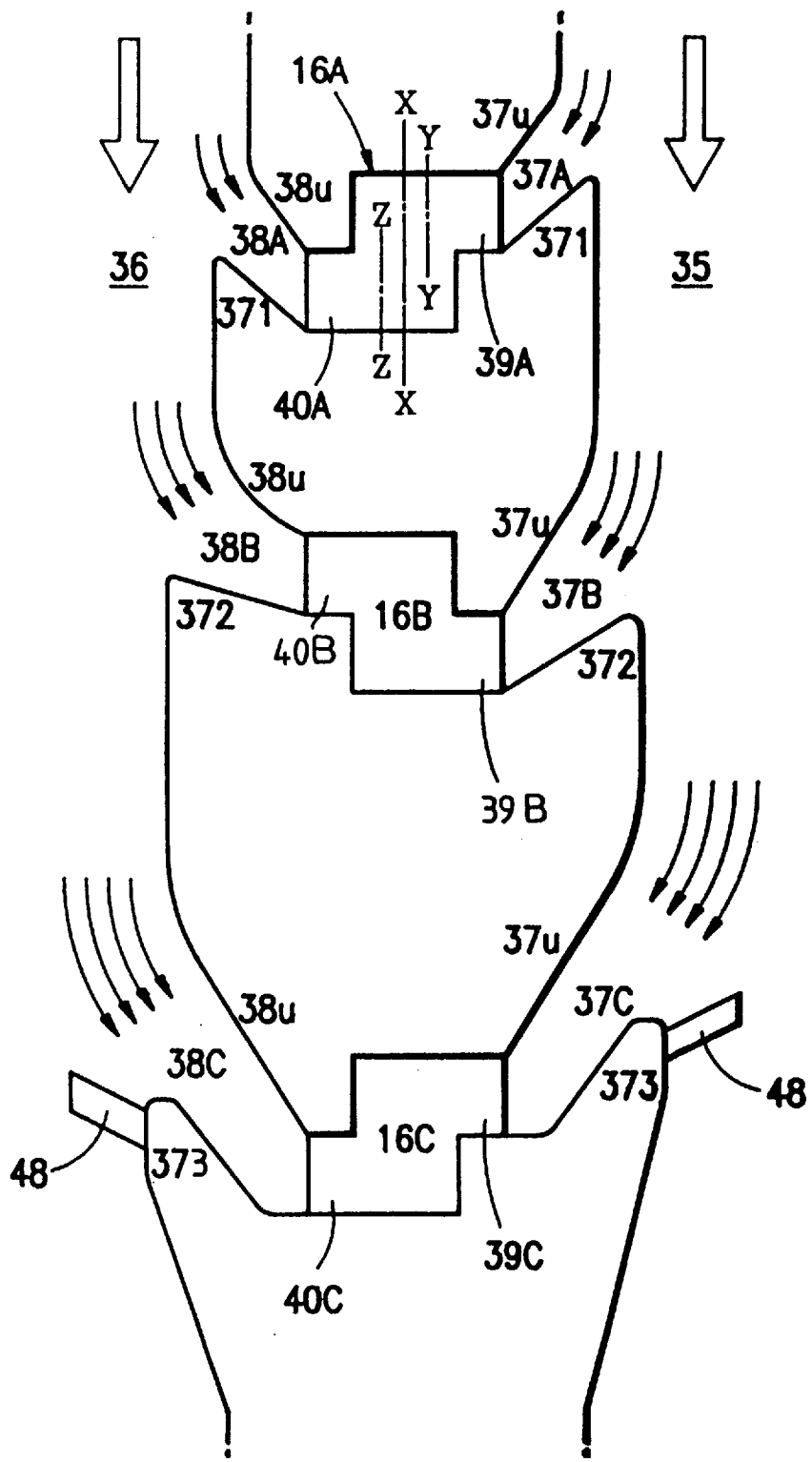

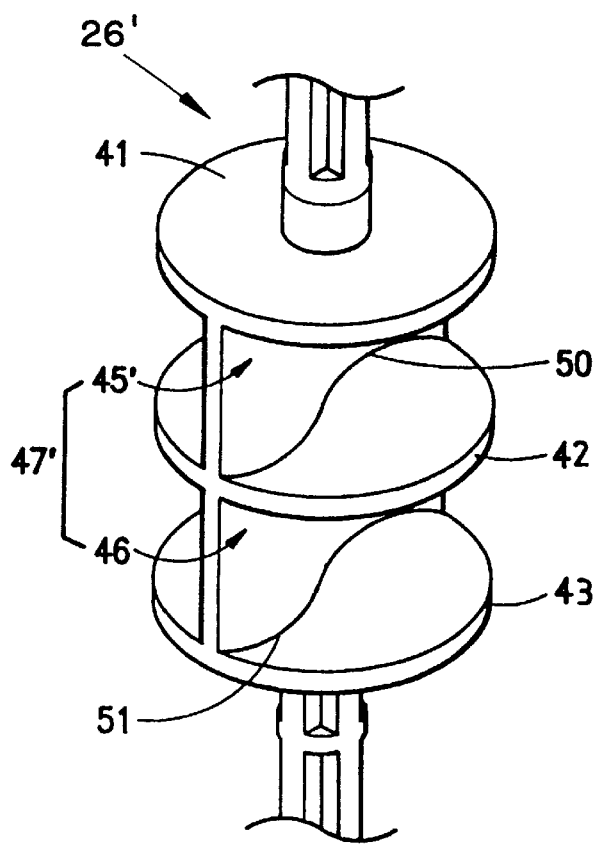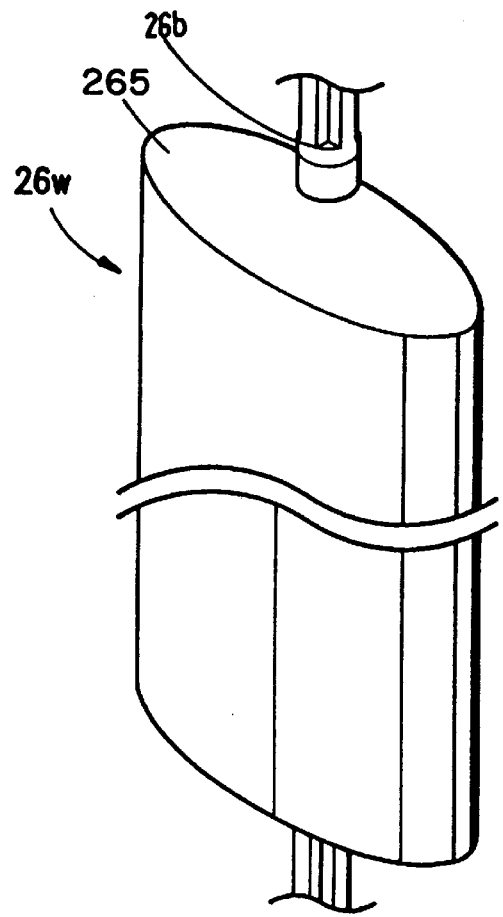

10
REFRIGERATOR

RELATED INVENTION

This invention is related to the inventions disclosed in International Applications PCT/KR95/00063 and PCT/KR95/00064, the national phase of which was filed in the U.S. Patent & Trademark Office on Nov. 13, 1995 as Ser. Nos. 08/553,443 and 08/545,856, respectively.

BACKGROUND OF THE INVENTION

This invention relates to a refrigerator, and more particularly to a refrigerator which has a cool air passage capable of distributing cool air into a refrigerating compartment.

As shown in FIG. 1, a conventional refrigerator is formed by mounting a freezing compartment door 6 and a refrigerating compartment door 7 on a refrigerator body 4 of a thermally insulated structure forming a freezing compartment 2 and a refrigerating compartment 3 which are partitioned from each other by an intermediate partition wall 1.

A compressor 11 is installed in a motor compartment 11M that is positioned under the refrigerating compartment 3, a condenser and capillary tube (not shown) are mounted in the interior of the body 4 or placed in the machine compartment 11M, and an evaporator 12 is mounted on the rear wall of the freezing compartment 2. The components are connected to each other by refrigerant tubes (not shown) to perform a refrigeration cycle.

A fan 13 for forcing cool air from the evaporator 12 into the freezing compartment 2 and the refrigerating compartment 3, is disposed above the evaporator 12. In order to guide the flow of the cool air, a grill 14 is placed before the fan 13 and a cool air duct 15a is disposed at the rear wall of the refrigerating compartment 3. Here, numeral 19 indicates a control damper for controlling the quantity of cool air which is introduced into the refrigerating compartment 3, and numeral 8 indicates shelves for receiving food items.

As a method for supplying cool air to the refrigerating compartment, a conventional refrigerator generally adopts a shelf-by-shelf cool air discharge method. As shown in FIG. 2, in this method a plurality of cool air discharge openings 16a, which is provided for several areas partitioned by the shelves 8, is arranged in the up-and-down direction on the cool air duct 15a, so cool air is discharged towards the front into areas formed by the plurality of shelves 8.

In the above shelf-by-shelf cool air discharge to method, uniform distribution of the cooled air is not achieved since areas in the direct path of the blown air receives more cooled air than the remote regions of each area. Arrangement of the food items further contributes to this problem. As an example, a bulky food item near a set of cool air discharge openings blocks the flow of air thus such an area receives less cooled air. A further problem exists in that since the cool air discharge openings 16a are perpendicular to the flow direction of cool air going through the cool air duct 15a, only a small portion of the cool air from the evaporator 12 passes through the upper cool air discharge openings, but most of the cool air flows down through the cool air duct 15a and discharges into the refrigerating compartment 3 through the lowest cool air discharge openings 16a. Accordingly, food items on the upper shelves of the refrigerating compartment 3 can not keep a proper refrigerating temperature, whereas the food items on the lower shelves are overcooled. Another problem exists in that some newly stored food items may be at an initial temperature significantly higher than the temperature in the cooling compartment. In this case, a need arises for concentrating the cooled air flow to the warm/hot food items to effect rapid cooling as well as to avoid warming of the immediately surrounding food items. Conventional systems do not offer such a compensating means. Accordingly, the above-described situations contribute to an undesired condition in which there may exist a significant variation of temperatures throughout the cooling compartment.

In an attempt to distribute the cool air more evenly, a three-wall cool air discharging method has recently been developed. As shown in FIG. 3, a refrigerator according to this method has a plurality of cool air discharge openings 16s on the side walls of the refrigerating compartment 3 as well as the cool air discharge openings 16a on the rear wall of the refrigerating compartment 3, in order to discharge cool air from the side walls as well as the rear wall.

However, such a refrigerator fails to provide a uniform air flow throughout the cooling compartment. That is, there still exist areas such as corners, which are not directly exposed to the cooled air flow. Furthermore, such a refrigerator does not offer means to concentrate the cooled air flow to a specified area depending upon the detected condition of the cooling compartment.

The above-described inadequacies of conventional refrigerators are especially clear in the case that food items of a higher temperature are stored at remote areas such as the upper or lower corners of the refrigerating compartment.

Since larger-capacity refrigerators suffer the above problems more noticeably and since consumer demand for such refrigerators has been increasing, the need for solving the above problems has become increasingly important.

SUMMARY OF THE INVENTION

It is, accordingly, an object of this invention to provide a refrigerator capable of maintaining a uniform temperature over the whole volume of a cooling compartment by evenly dispersing the evaporated cool air in multi-directions.

It is a further object to provide a refrigerator capable of achieving concentrated refrigeration to a specified area of the compartment depending upon the detected temperature within a plurality of specified areas of the cooling compartment.

In accordance with advantageous features of the present invention, a refrigerator is provided with
- a body partitioned into a freezing compartment and a refrigerating compartment;
- an evaporator disposed in the body; and
- an air distribution apparatus disposed on one wall of the refrigerating compartment, and provided with a first air passage for guiding the flow of the cool air generated from the evaporator, and a second air passage for guiding the down-flow of the cool air through the first air passage;
- the air distribution apparatus comprising a plurality of openings for discharging into the refrigerating compartment in an up-down and right-left directions the cool air guided by the second air passage formed in a longitudinal direction.

Further, refrigerator is provided with
- a body partitioned into a freezing compartment and a refrigerating compartment;
- an evaporator disposed in the body; and
- an air distribution apparatus disposed on one wall of the refrigerating compartment, and comprised with a first air passage for guiding the flow of the cool air generated from the evaporator and a second air passage for guiding the down-flow of the cool air through the first air passage;

the air distribution apparatus further comprising a plurality of openings for discharging into the refrigerating compartment in an up-down and right-left direction the cool air guided by the second air passage formed in a longitudinal direction, a swing-wing rotatably disposed thereat for controlling the air discharging direction through openings, and a driving motor for rotating the swing-wing.

Further, refrigerator is provided with:

a body partitioned into a freezing compartment and a refrigerating compartment;

an evaporator disposed in the body; and an air distribution apparatus disposed on one wall of the refrigerating compartment, the air distribution apparatus comprised with a first air passage for guiding the flow of the cool air generated from the evaporator, a second air passage having a first duct and a second duct which are arranged in a longitudinal direction at both longitudinal edges for guiding the down-flow of the cool air through the first air passage, a plurality of openings disposed between the first duct and the second duct for discharging the air along the second air passage into the refrigerating compartment, the air distribution apparatus further comprising a plurality of openings for discharging into the refrigerating compartment, in an up-down and right-left direction, the cool air guided by the second air passage formed in a longitudinal direction, a swing-wing rotatably disposed for controlling the air discharging direction through the opening, and a driving motor for rotating the swing-wing.

Furthermore, a refrigerator is provided having:

an air distribution apparatus disposed on the rear wall of the refrigerator;

a second air passage disposed at one surface of the air distribution apparatus for guiding the cool air;

a plurality of openings connecting with the second air passage;

swing-wing rotatably disposed at the air distribution apparatus and having a plurality of wing members corresponding to the respective openings; and a driving motor disposed in the upper portion of the air distribution apparatus, being placed in a motor case for rotating the swing-wing.

Furthermore, a refrigerator is provided having:

an air distribution apparatus disposed on the rear wall of the refrigerator;

a second air passage disposed at one surface of the air distribution apparatus for guiding the cool air;

a plurality of openings connecting with the second air passage; and a swing-wing rotatably disposed at the air distribution apparatus and having a plurality of wing members corresponding to the respective openings, the wing members comprising a dividing plate for horizontally inducing the cool air through the opening and a distributing wing formed perpendicularly between the dividing plates for distributing the cool air.

BRIEF DESCRIPTION OF THE DRAWINGS

FIG. 9B is a schematic view showing an arrangement of the air passage and the discharge opening;

FIGS. 10A, 10B, 10C, 10D and 10E are perspective views of a swing-wing system adapted to the cool air distribution apparatus showing modification embodiments thereof;

DETAILED DESCRIPTION OF PREFERRED EMBODIMENTS OF THE INVENTION

Figure 1:
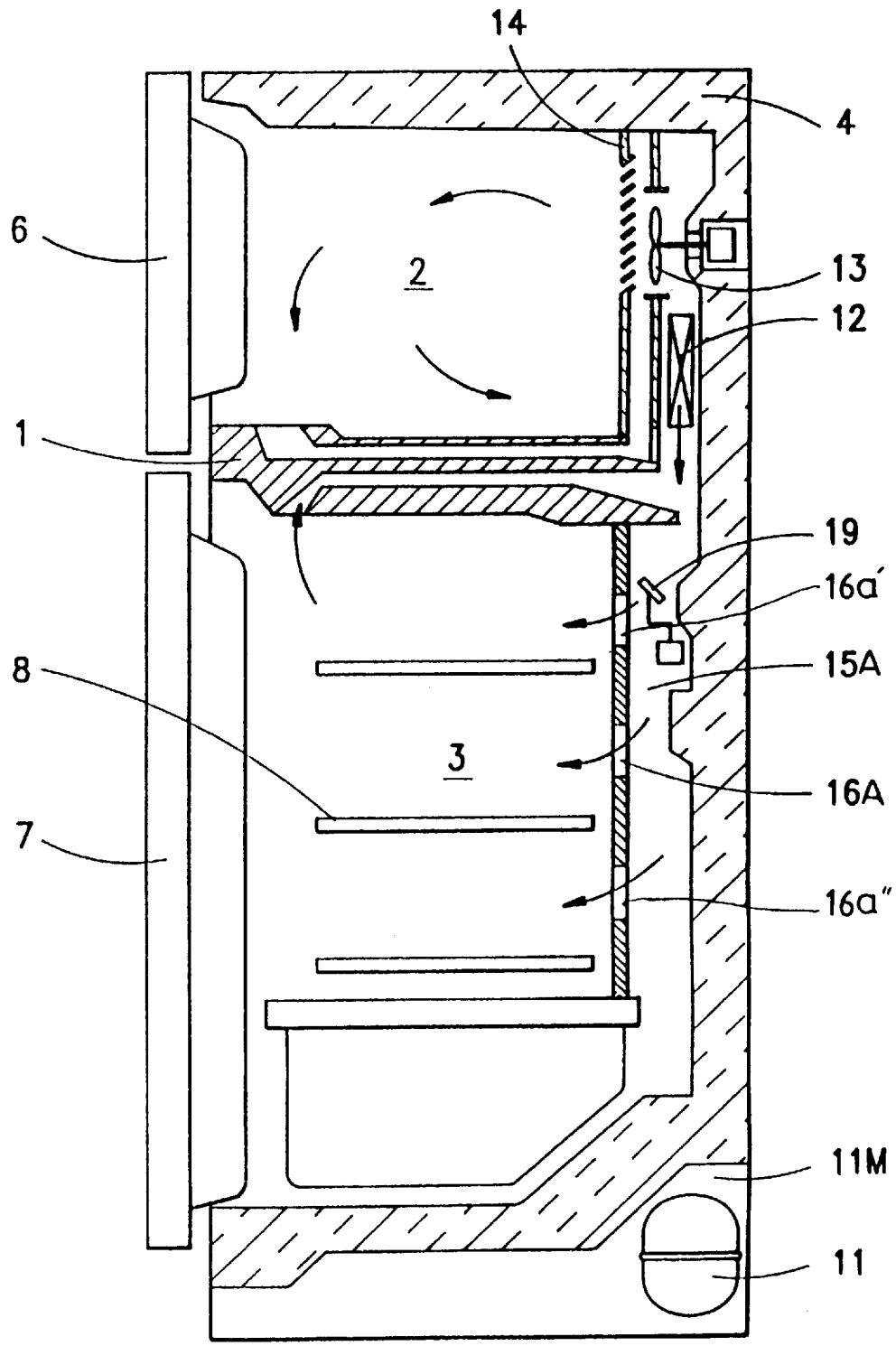
FIG. 1 is a vertical side cross-sectional view of a refrigerator according to a prior art.
Figure 2:
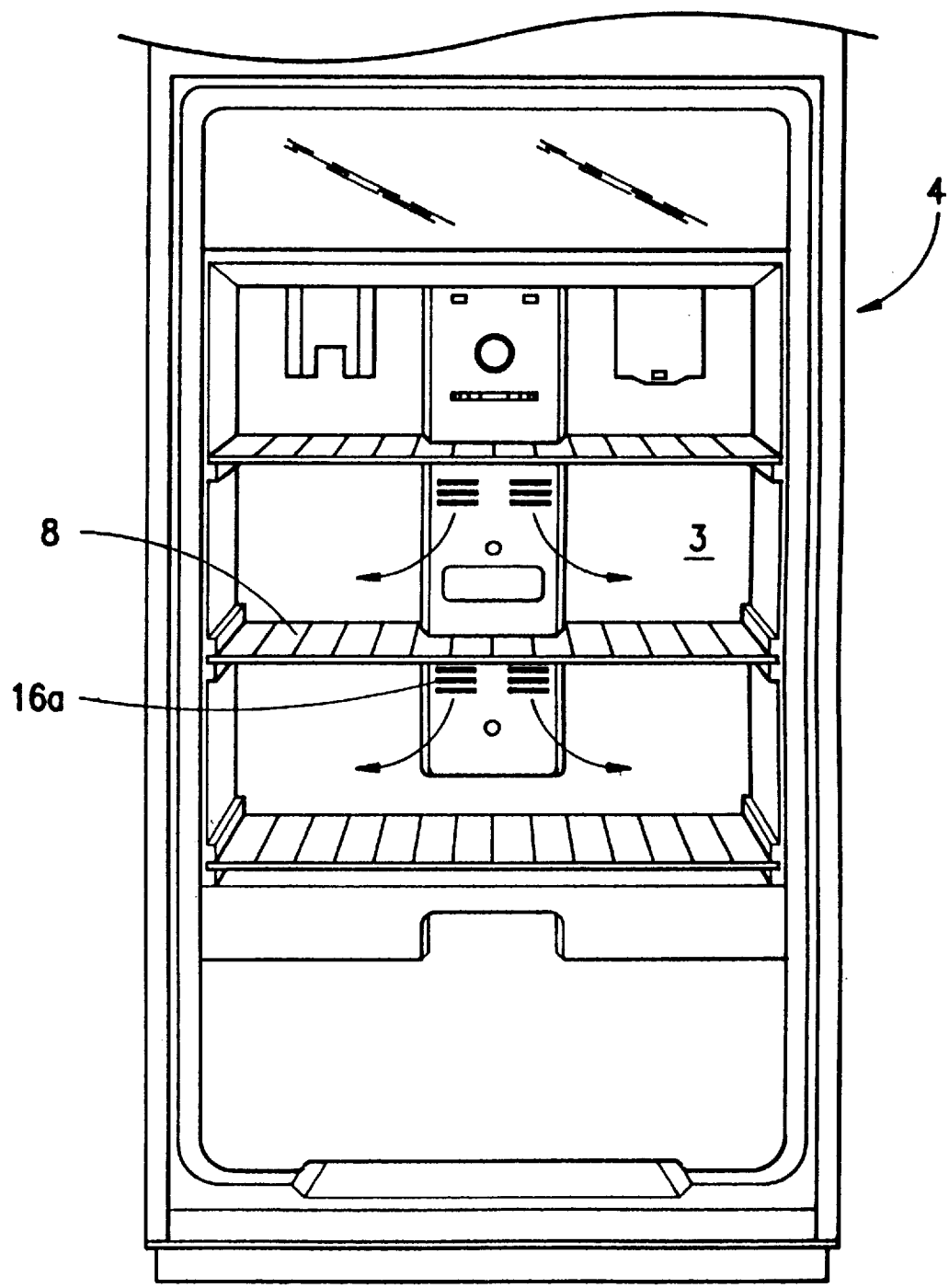
FIG. 2 is a front view of a refrigerator with a door removed and adopting a shelf by shelf cool air discharging method according to a prior art.
Figure 3:
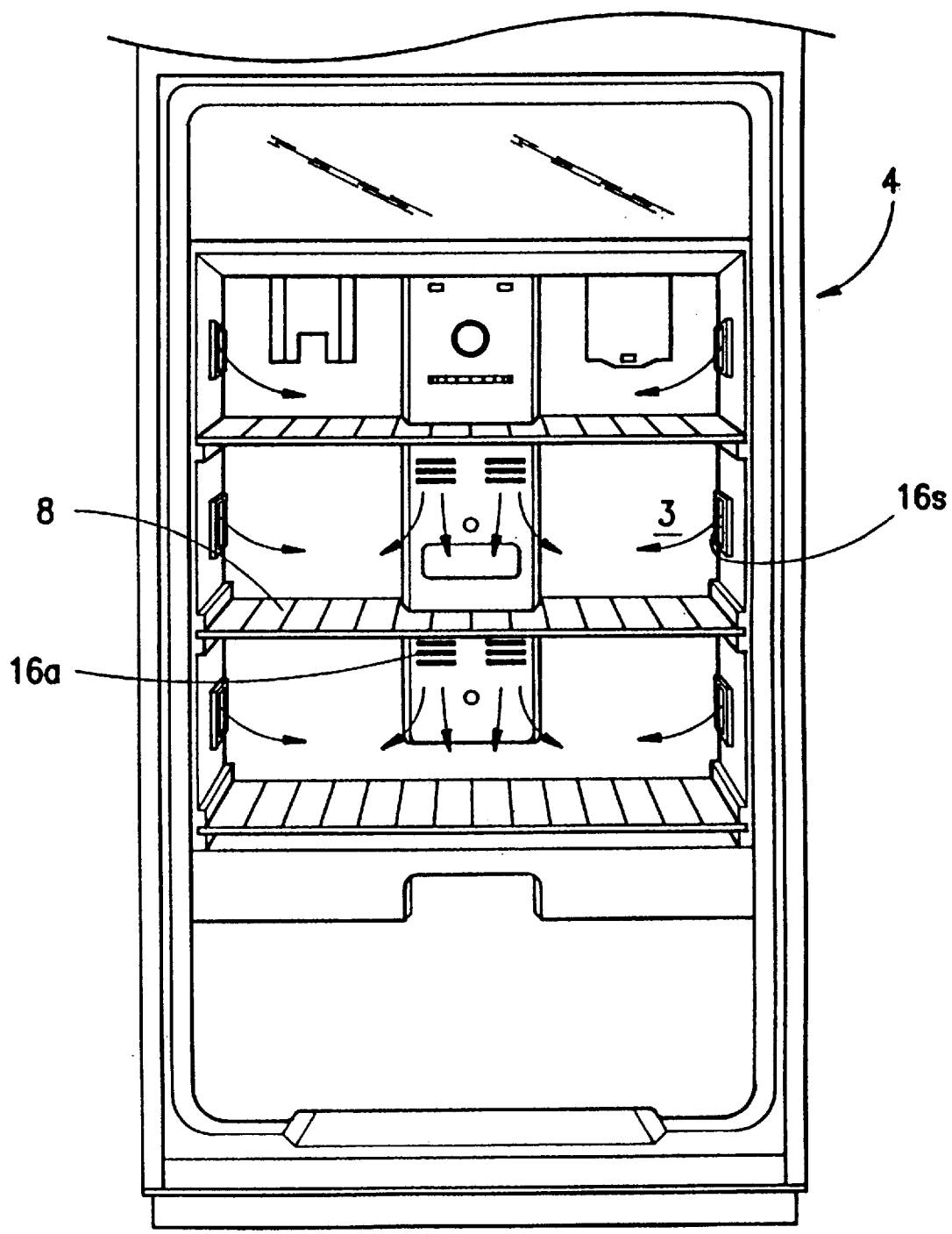
FIG. 3 is a front view of a refrigerator with a door removed and adopting a three wall cool air discharging method according to a prior art.
Figure 4:
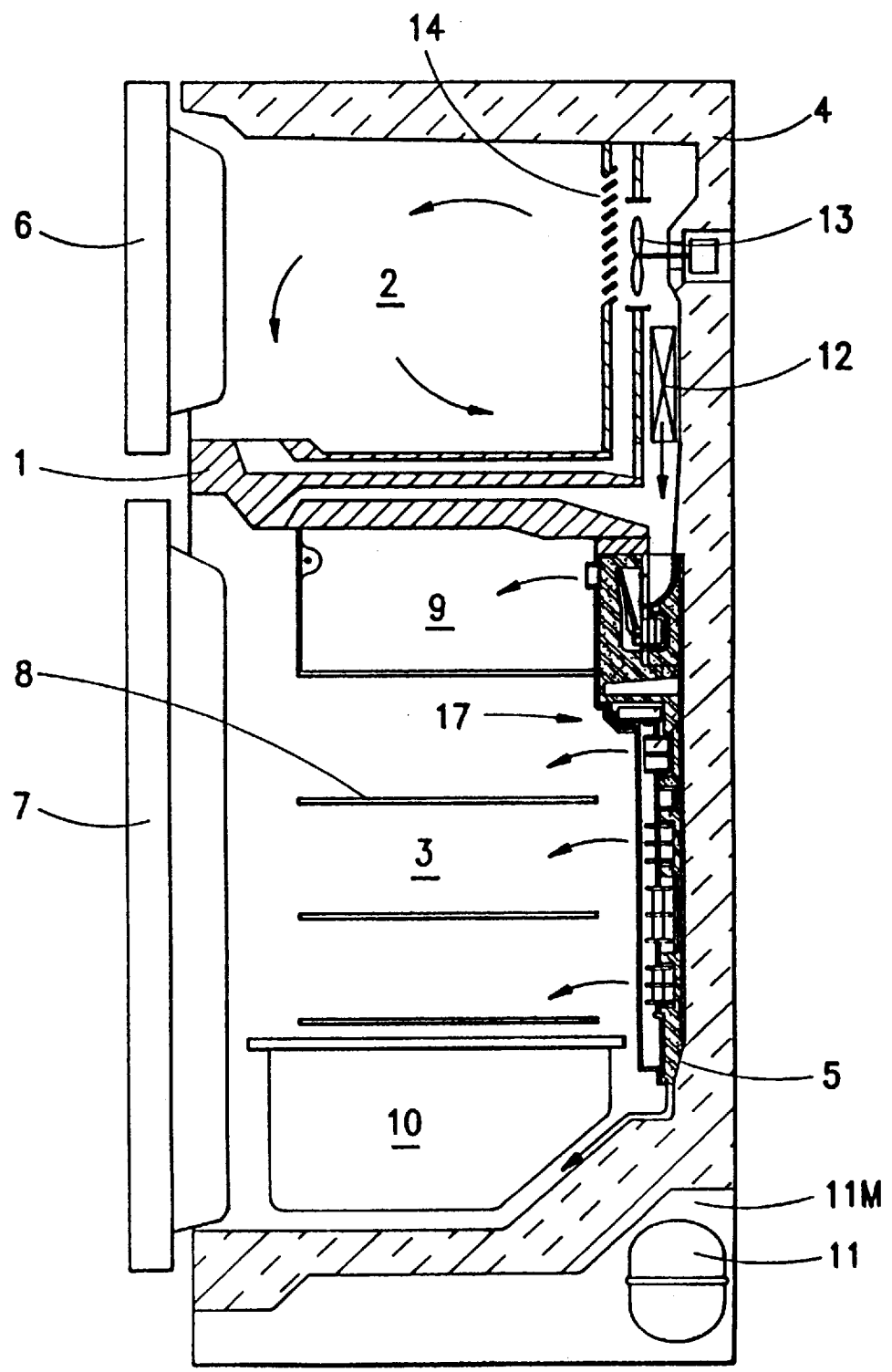
FIG. 4 is a vertical side cross-sectional view of a refrigerator according to the present invention.

In FIG. 4, the refrigerator is comprised of a body 4 shielded by an insulating material which includes a freezing compartment 2 and a refrigerating compartment 3, which are partitioned by an intermediate wall 1. Further, respective compartments 2, 3 are equipped with doors 6, 7 on the front side of the compartments 2, 3. In the refrigerating compartment 3 are installed a plurality of shelves 8 for supporting foodstuffs. At the upper portion of the refrigerating compartment 3 is formed a third compartment 9 for allowing the foodstuffs to be stored within a temperature range relative to the individual characteristics of the specific foodstuffs. A vegetable compartment 10 is formed at the lowest portion of the refrigerating compartment 3. A compressor 11 is installed in a motor compartment 11M, and a condenser and a pressure reducing device, which are not shown are installed in the wall of the body 4 or in motor compartment 11M. Further, an evaporator 12 is mounted in the rear wall of the freezing compartment 2. All of the components are interconnected by a refrigerant tube (not shown) for accomplishing the refrigerating cycle.

Above the evaporator 12 is installed a fan 13 for forcefully blowing the cool air generated from the evaporator 12 into the freezing compartment 2 and the refrigerating compartment 3. To guide the cool air, a grill 14 is mounted in front of the fan 13. At the rear wall of the refrigerating compartment 3 is mounted a cool air distribution apparatus 17 having a cool air passage and discharge openings which will be explained later. Thus, the cool air generated by the evaporator 12 is divided between the freezing compartment 2 and the refrigerating compartment 3. Numeral 5 is a recess for housing the cool air distribution apparatus 17.

Figure 5:
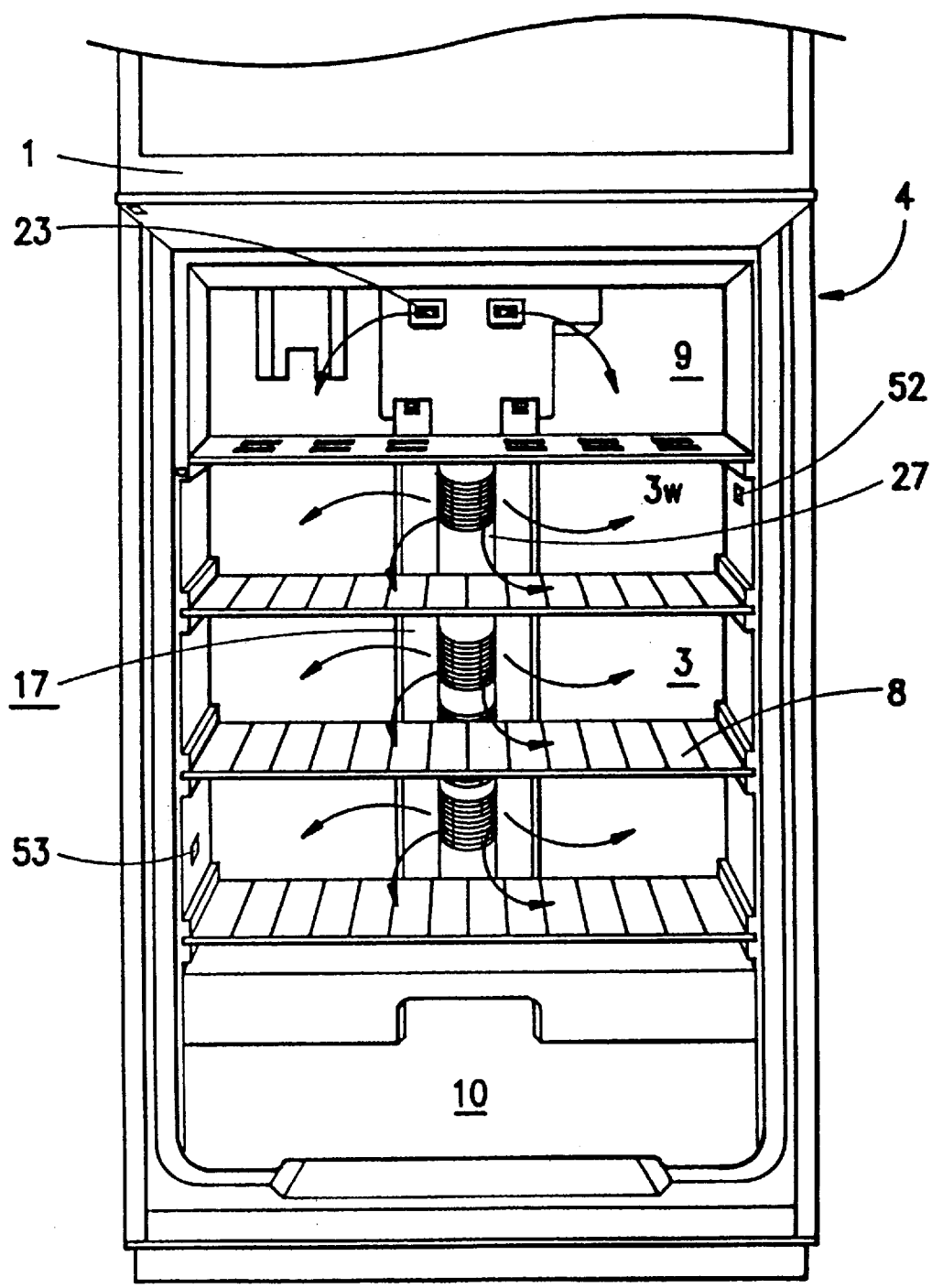
FIG. 5 is a front view of a refrigerator of FIG. 4 with a door.

As shown in FIG. 5, the cool air distribution apparatus 17 is installed at the horizontally central portion of the rear wall 3W of the refrigerating compartment 3. An upper portion of the air distribution apparatus 17 is positioned behind the third compartment 9, while a middle and a lower portion of the air distribution apparatus 17 are positioned behind the area of the refrigerating compartment 3 excluding the third compartment 9 and the vegetable compartment 10. That is, the upper end of the air distribution apparatus 17 is placed adjacent to the intermediate wall 1, and the lower end thereof is placed adjacent to the vegetable compartment 10. The entire height of the air distribution apparatus 17 approximately equals the height of the refrigerating compartment 3 plus the third compartment 9.

Figure 6:
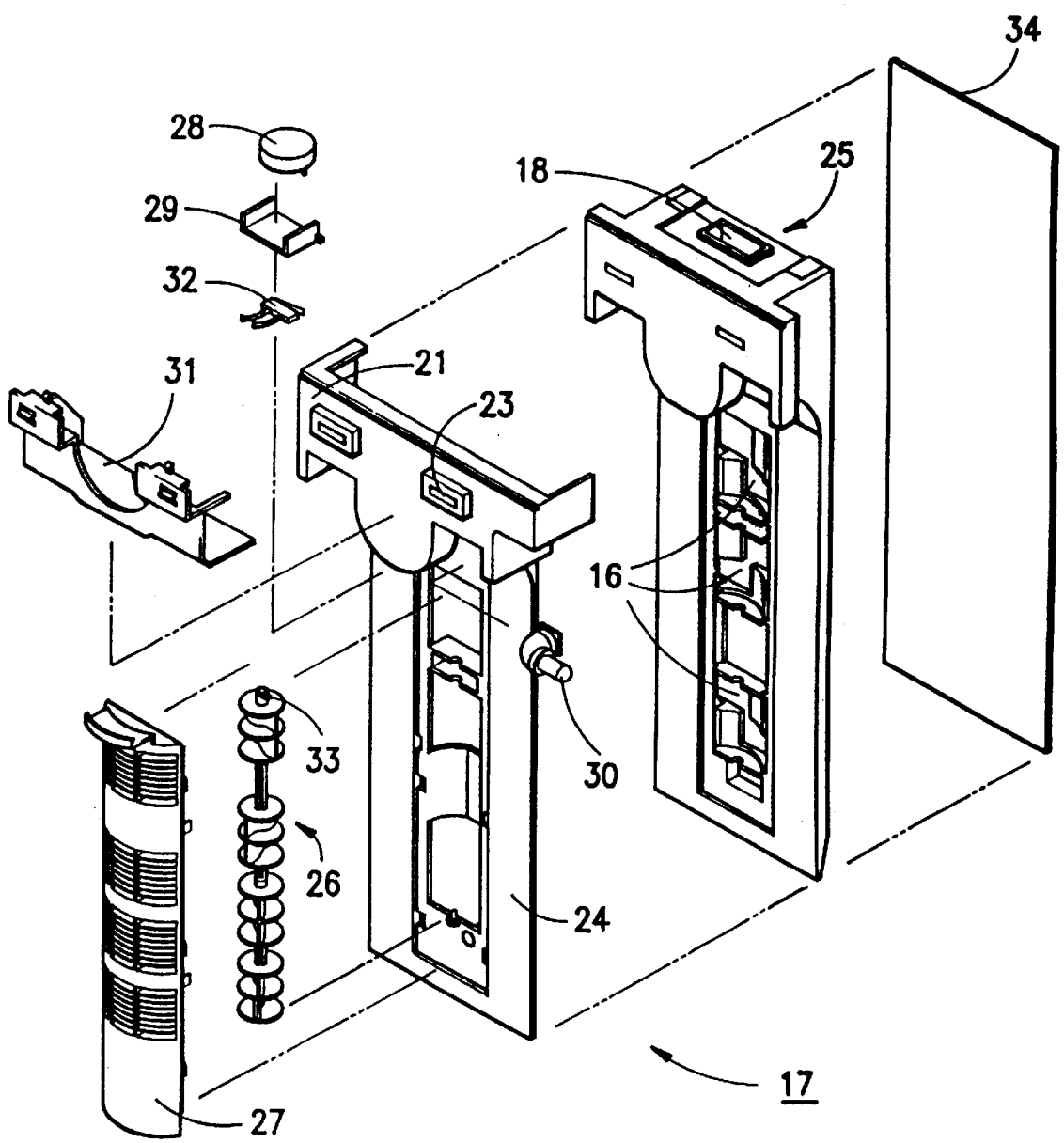
FIG. 6 is an exploded perspective view of a cool air distribution apparatus according to the present invention.

The cool air distribution apparatus 17, as shown in FIG. 6, comprises a front plate 24 made from a synthetic resin, a rear plate 25 which is made from insulative material and is assembled with the front plate 24, and a seal plate 34 covering the back face of the rear plate 25. A swing-wing 26 is detachably provided at the forward surface of the front plate 24. At the upper end of the swing-wing 26 is provided a motor 28 for operating the swing member 26. The motor 28 seated on a motor case 29 is installed in the upper portion of the front plate 24. At each side end of the motor 28 is mounted an indoor lamp 30. Numeral 31 is a lamp cover for shielding the lamps 30.

In the embodiment, since the motor 28 is seal-mounted at the upper portion of the swing-wing 26, moisture of the compartment can not penetrate into the motor 28. Because the moisture or the condensed water flows down due to its gravity there is no worry about its penetration into the motor 28. Further, there is less possibility of the moisture penetration due to the motor being housed by the case 29. Excess cooling caused by a decrease of the motor speed can not occur since there can only be indirect contact of moist air with the motor. Even if the water penetrates, the water is immediately evaporated by the heat from the lamps 30 mounted nearby, thereby preventing the problem of inoperablity of the motor 28 due to the penetration of the water. Thus, this has the advantage that no decrease of the motor speed, and excess cooling as a result of moisture occurs. In the embodiment, a geared motor having a fixed rotation speed is employed as the operating motor. However, a stepping motor can be employed to control the rotation speed of the swing-wing as well as the forward and the reverse rotations of the swing-wing.

Numeral 32 is a position sensing switch for controlling the rotation position of the swing-wing 26, which is turned "on/off" by a protuberance 33 provided at the upper end of the swing-wing 26. Numeral 27 is a grill detachably assembled with the front plate 24 for the protection of the swing-wing 26. The grill 27 prevents foodstuffs housed in the compartment from prohibiting the rotation of the swing-wing 26.

Figure 7:
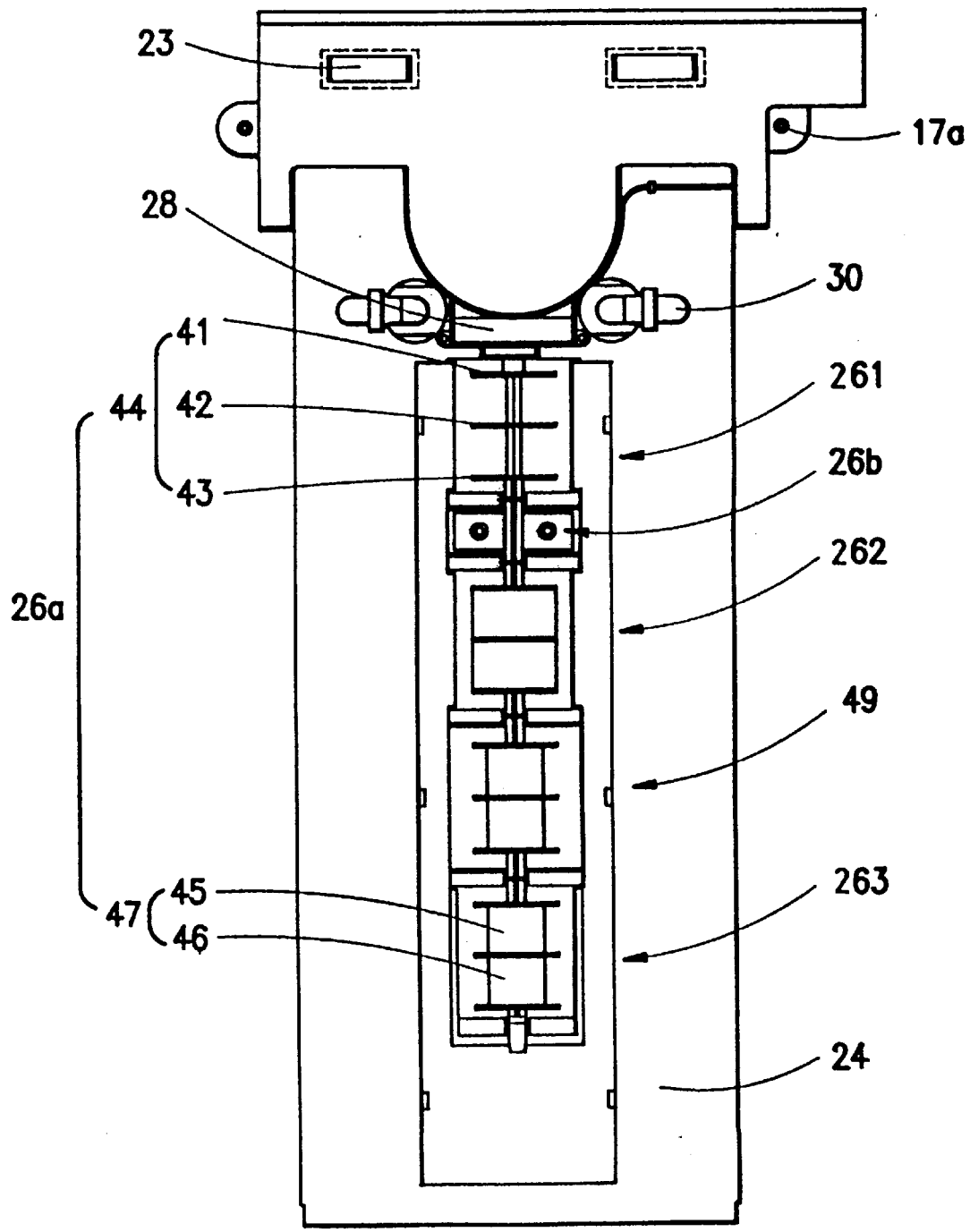
FIG. 7 is a front view of the cool air distribution apparatus.
Figure 8:
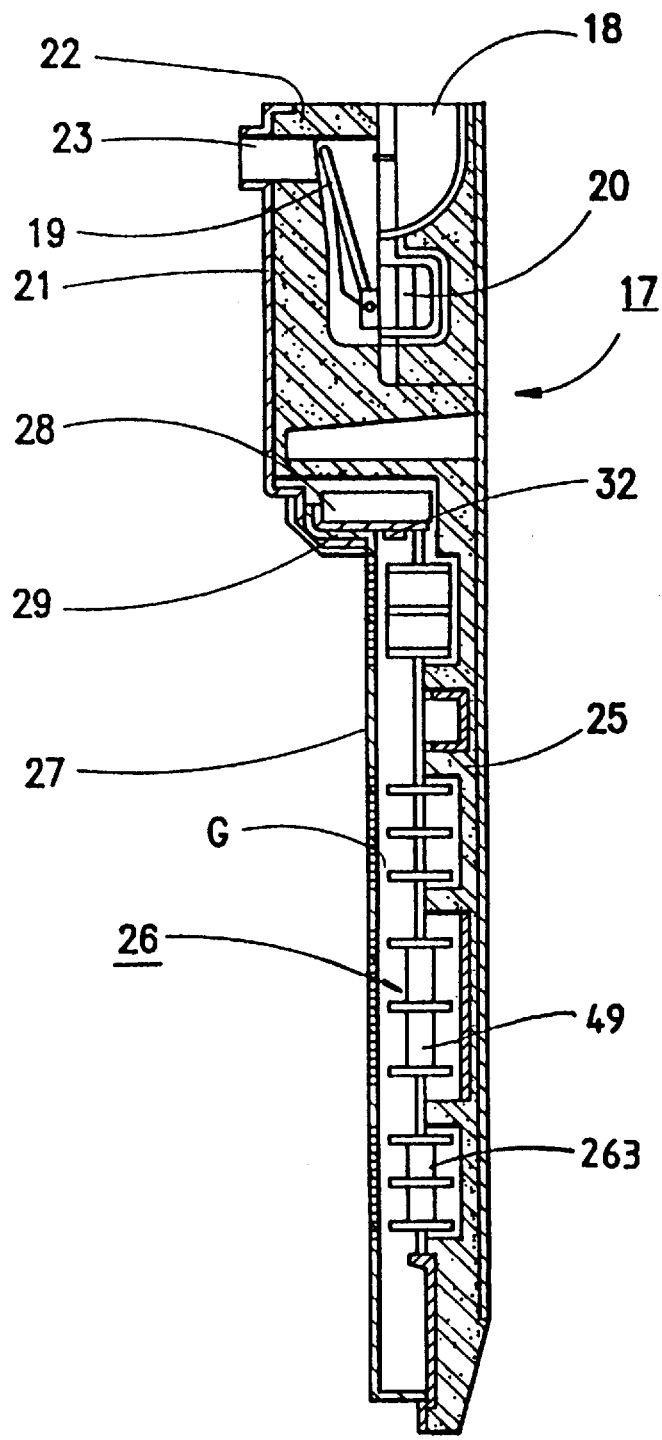
FIG. 8 is a side cross-sectional view of the cool air distribution apparatus.

In FIGS. 7 and 8, the upper portion of the air distribution apparatus 17 comprises an air passage 18 for guiding the flow of the cool air generated from the evaporator 12, a baffle plate 19 for regulating the cool air volume fed into the refrigerating compartment 3 according to the opening/shutting of the baffle plate 19, and a motor 20 for operating the baffle plate 19. The temperature control for these components is achieved by a conventional method. Numeral 21 is a baffle cover and is integrally formed with the front plate 24 in the embodiment. Numeral 22 is a spacer which is made from an insulative material. The thickened spacer 22 prevents frost, caused by cool air passing through the air passage 18, from forming on the outside wall of the baffle cover 21. The spacer 22 may be sized approximately 10 cm in depth and 34 cm in width. This size is proper for the 400 to 500 liter volume refrigerator, since the size is dependent on the volume of the refrigerator. Numeral 23 is an air discharge opening which is provided at the upper portion of the front plate 24, by which the cool air through the air passage 18 is discharged into the third compartment 9. In the embodiment, a couple of the discharging openings 23 are formed at the upper portion of the front plate 24. Therefore, the third compartment 9 is at a lower temperature than the refrigerating compartment 3, since the travelling distance of the air from the air passage 18 to the air discharging opening 23 is shorter than that from the air passage 18 to the middle portion and the lower portion of the air distribution apparatus 17.

The middle portion and lower portion, but not the upper portion, of the air distribution apparatus 17 is each approximately 3 cm in depth, 25 cm in width. The whole air distribution apparatus 17 can be made from an injection mold material, but the front plate 24 of 2 mm thickness is formed by a synthetic resin mold and assembled with the rear plate 25 formed of styrofoam in the embodiment. The swing-wing 26 disposed in front of the middle portion and the lower portion of the front plate 24 is comprised of four sets of wing members 26a integrally formed with a columnar member 26b. The position of respective wing members 26a corresponds with the partitioned space between the shelves 8 of the refrigerating compartment 3. The uppermost wing member 261 is disposed at ¾ H, the middle wing member 262 at ½ H, and the lower wing member 263 at ⅓ H, assuming that the height of the refrigerating compartment 3 is "H". One of the wing members is a phantom (dummy) wing member 49 disposed between the middle wing member 262 and the lower wing member 263. The position of the phantom (dummy) wing member 49 is irrelevant to the position of the shelves 8, and it is provided in consideration of the appearance and manufacturing ease of the air distribution apparatus 17. The configuration of the swing-wing 26 will be explained later.

The distribution apparatus 17 once assembled is detachably installed on the rear wall 3W, and it is more desirable that the front plate 24 is placed against an surface that is flush with respect to the rear wall 3W of the refrigerating compartment 3. That is, as shown in FIG. 6, the seal-plate 34 adheres to the rear side of the rear plate 25 which is assembled with the front plate 24, and the swing-wing 26 and the grill 27 are assembled to the front plate 24, and then the motor 28 and the indoor lamp 30 are assembled. Finally, the assembly is inserted in the rear wall 3W (FIG. 5). Therefore, in comparison to a prior art apparatus in which many individual components are installed in the refrigerating compartment, the installation work using the components of the present invention is more simple. Numeral 17a (FIG. 7) are holes which receive screws for installing the air distribution apparatus 17 on the rear wall 3W conveniently.

Figure 9A:
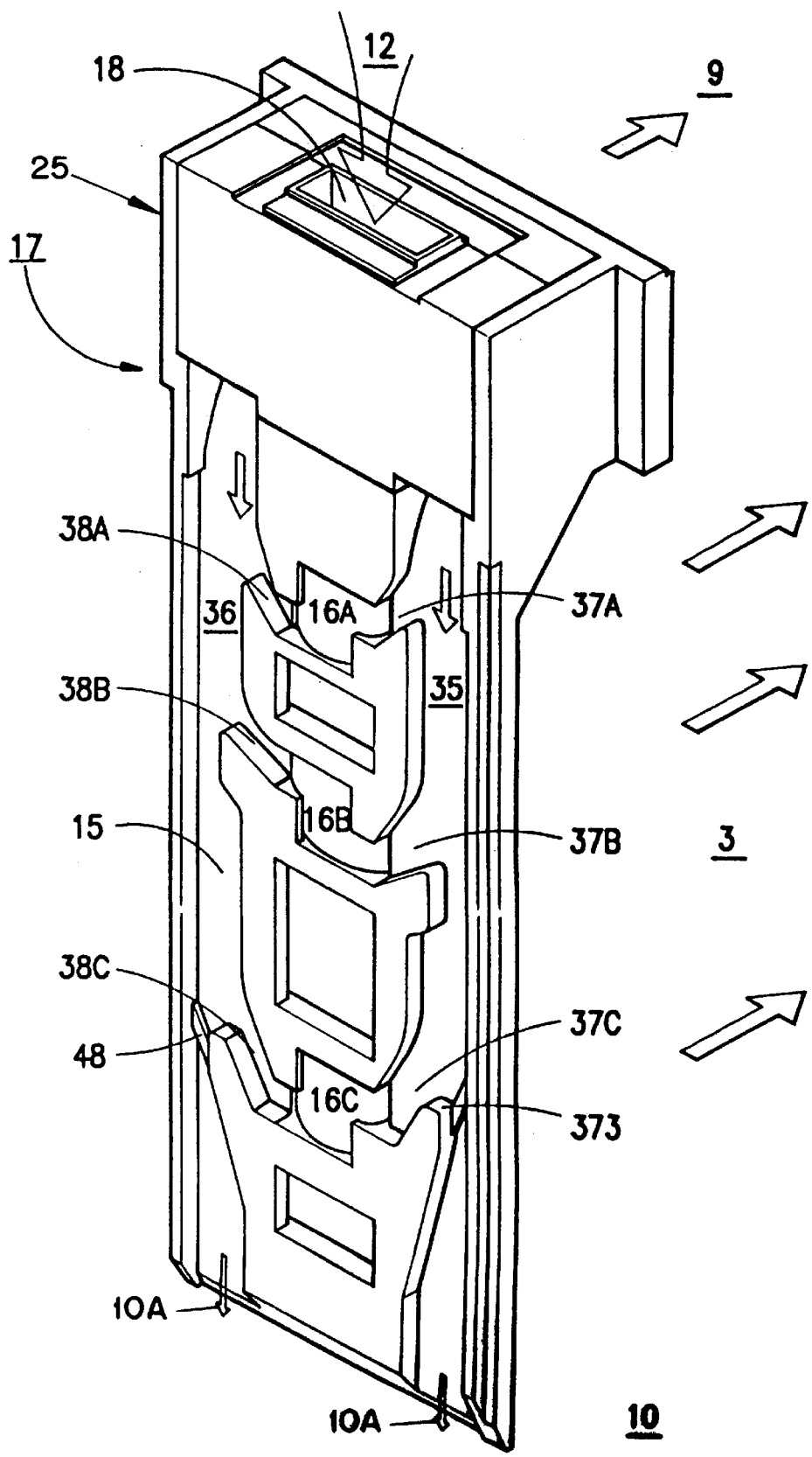
FIG. 9A is a rear perspective view of the cool air distribution apparatus.

In FIG. 9A, the air distribution apparatus 17 comprises an air passage 15 and the openings 16 which discharge the air from the air passage 15 into the refrigerating compartment 3. The air passage 15 is formed in a longitudinal vertical direction at the rear surface of the air distribution apparatus 17. The openings 16 are for connecting the air passage 15 with the refrigerating compartment 3. Each opening 16 is provided in an up and down manner along the vertical center line. The air passage 15 is provided with a first duct 35 and a second duct 36 arranged adjacent respective vertical edges of the apparatus 17. The respective openings 16A, 16B and 16C are positioned to correspond to the spaces between the shelves 8 in the same way as the wing member 26a. In the embodiment, ahead of each opening 16 is arranged a respective wing member 26a (except the dummy one) of the swing-wing 26 (FIG. 7), and thus, the number of the openings 16 is three. Since the wing member 26a is placed ahead of the opening 16, where the thickness of the air distribution apparatus 17 is thinnest, the protruding dimension of the distribution apparatus 17 toward the refrigerating compartment 3 is lowered, thereby preventing the available volume of the refrigerating compartment 3 from decreasing.

The upper portion of each of the first and second ducts 35, 36 is expanded, as are the lower portions of the first and second ducts 35, 36. The air, via the air passage 18 flows into the first and second ducts 35, 36. Most of the air flows down along the ducts 35, 36 to be discharged into the refrigerating and vegetable compartments 3, 10. The remaining volume of the air is discharged toward the third compartment 9 through the discharging opening 23 (FIG. 8). For guiding the downflowing air into the refrigerating compartment 3, the air passage 15 comprises a first branch duct which connects the first duct and the openings 16, and a second branch duct which connects the second duct and the openings 16. Thus, the air flowing along the first and second ducts 35, 36 is guided to the first and second branch ducts 37A, 37B, 37C, 38A, 38B, 38C, thereby discharging into the refrigerating compartment 3 through respective openings 16A, 16B, 16C.

The first and second branch ducts as shown in FIG. 9B, each has a wide inlet which is connected to the first and second ducts 35, 36, and a narrow outlet which is connected to the opening 16. The wide inlet of the branch ducts 37, 38 has the configuration that the upper portions 37U, 38U are rounded and the lower portions are shaped to form shoulder 371, 372, 373 in which the middle shoulder 372 is more extended outwardly (i.e., to the right and the left in FIG. 9B) than the uppermost shoulder 371, and the lower shoulder 373 is more extended outwardly than the middle shoulder 372. The flowing down air along the ducts 35, 36 is caught by the shoulders 371, 372, 373 to smoothly flow toward the exit of the branch ducts.

It is more desirable that the rounded length of the upper portions 37U, 38U of the middle branch duct 37B is longer than that of the uppermost branch duct 37A, and the rounded length of the upper portions 37U, 38U of the lower branch duct 37C is longer than that of the middle branch duct 37B. The protruding length of the shoulder is larger as the position of the shoulder goes lower. Since the later discharging air has a longer length to travel, the temperature of the air is higher. The lower it goes, the greater amount of air is needed. The configuration of the branch ducts as described above is very helpful to minimize the deviation of the air temperature in respect to the height of the refrigerating compartment 3. That is, more air is fed through the middle branch ducts 37B, 38B than is fed through the uppermost branch ducts 37A, 38A, and more air is fed through the lower branch ducts 37C, 38C than the middle branch ducts 37B, 38B. This achieves a uniform cooling in the refrigerating compartment 3.

Next, at the lower end of the first and second ducts 35, 3G, i.e. below the inlet of the first and second branch ducts 37C, 38C are provided restrictions 48 having a predetermined height for reducing the air volume supplied to the vegetable compartment 10 via arrows 10A in FIG. 10 and increasing the air volume for the refrigerating compartment 3 through the openings 16. Thus, the temperature of the refrigerating compartment 3 stays lower than the vegetable compartment 10.

Furthermore, to feed the cool air in a right or a left hand direction into the refrigerating compartment 3, the opening 16A comprises a first discharging portion 39A connected to the first branch duct 37A (see FIG. 9B), and a second discharging portion 40A connected to the second branch duct 38A. It is more desirable that the vertical center line Y—Y of the first discharging portion 39A is not aligned with that Z—Z of the second discharging portion 39A. That is, the vertical center line Y—Y of the first discharging portion 39A is offset toward the first branch duct 37A with respect to the vertical center line X—X of the opening 16A, while the vertical center line Z—Z of the second discharging portion 40A is offset toward the second branch duct 38A with respect to the vertical center line X—X of the opening 16A. The air through the opening 16A is discharged in different directions, thereby causing a smooth discharge flow into the refrigerating compartment 3. When the air through the first discharging portion 39A is directed toward the left side, the air through the second discharging portion 40A is directed toward the right side. The air is smoothly discharged without head-to-head collision. Next, in the opening 16B adjacent to the opening 16A, the positions of the first and second discharging portions 37B, 38B are reversed with respect to that of the first and second discharging portions 37A, 38A. That is, at the opening 16A the first discharging portion 39A is placed above the second discharging portion 40A, but at the opening 16B the second discharging portion 40B is placed above the first discharging portion 39B. The later the air is discharged, the more the temperature of the air rises. In the opening 16B, through the branch duct 38B a relatively cooler air than the temperature of the air reaching the branch duct 37B is supplied. Next, in the opening 16C, through the branch duct 37C a relatively cooler air than the temperature of the air reaching the branch duct 38C is supplied. This achieves the uniform cooling in the refrigerating compartment, prohibiting the deviation of air temperature between the right and the left side of the refrigerating compartment.

Figure 10A:
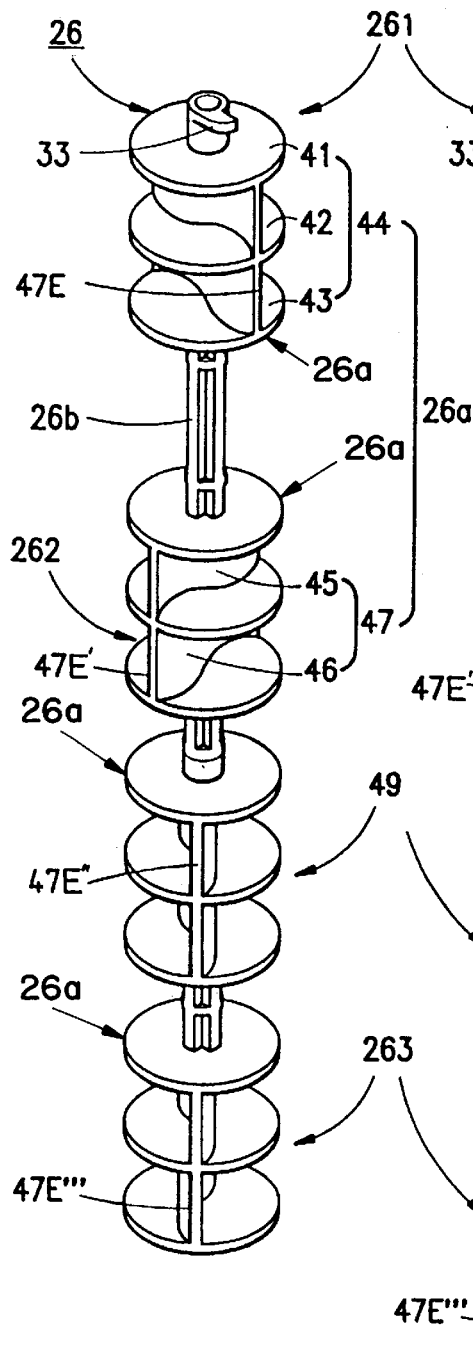
Figure 10B:
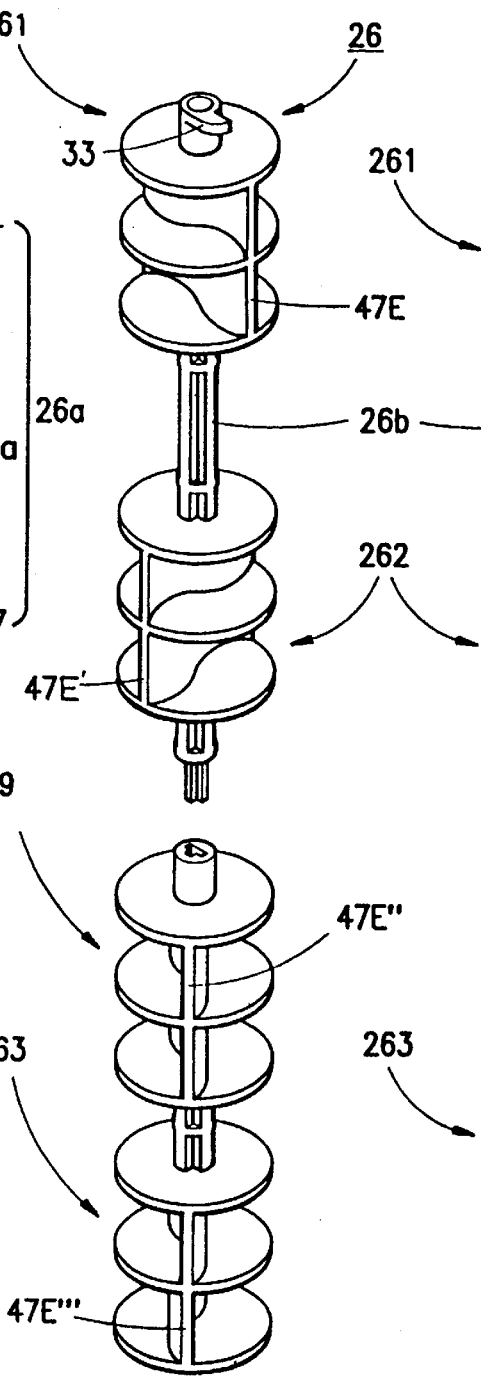
Figure 10C:
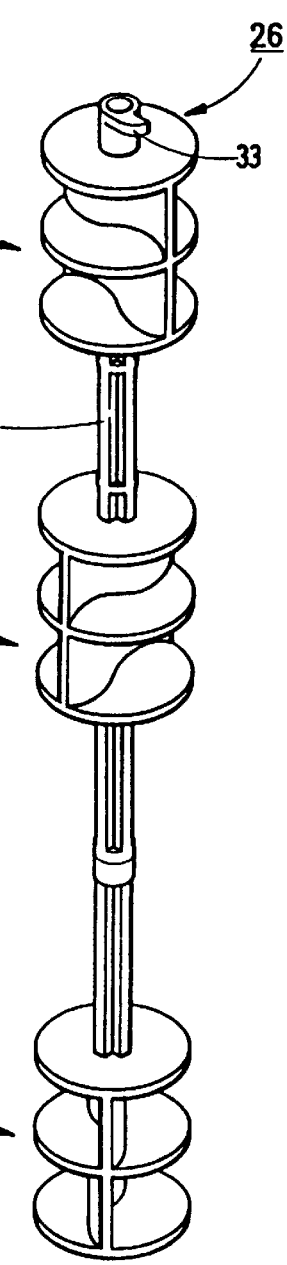

FIGS. 10A, 10B and 10C show various embodiments of the swing-wing 26. The swing-wing 26 comprises a plurality of wing members 26a and a columnar member 26b. The wing member 26a comprises a dividing plate 44 having an upper plate 41, a middle plate 42 and a lower plate 43 which are spaced vertically from each other. The wing member 26a further comprises a distributing wing comprising a first inducing wing or vane 45 formed perpendicularly between the upper plate 41 and the middle plate 42 and a second inducing wing 46 or vane formed perpendicularly between the middle plate 42 and the lower plate 43. In the embodiment, the three sets 261, 262, 263 of wing members 26a, the dividing plate 44 and the distributing wing 47 are integral with the columnar member 26b (the remaining wing member 49 will be explained later). The upper end of the swing-wing 26 is connected to an output shaft (FIG. 6) of the driving motor 28 to operate the swing-wing 26. It is more desirable that the columnar member 26b is shaped with a crisscross cross-section.

Numeral 49, in FIGS. 10A and 10B, is a phantom (dummy) wing set which is irrelevant to the discharge of the cool air. Since no opening is provided at the corresponding position of the phantom (dummy) wing 49, it is irrelevant to the discharging flow of the air. However, through the gap G (FIG. 8) between the rear surface of the grill 27 and the circumference of the swing-wing 26, the cool air is fed into the space housing the phantom (dummy) wing 49. The air in the space is stirred by the phantom (dummy) wing 49 to increase the distribution effect with respect to the flow-down air to the lower wing member 263. Further, the balancing arrangement of the wing member provides external harmony in appearance.

The swing-wing 26 is detachably formed as shown in FIG. 10B to solve the problem rising from the tool manufacturing process. The upper portion of the swing-wing 26 is provided with the upper wing member 261 and the middle wing member 262, and the lower portion of the swing-wing 26 is provided with the lower wing member 263. In the case that the respective distributing wings 47 are molded in a different position to each other (as will be explained in more detail later), it has the difficulty that one cavity molding tool can not be used. Therefore, the swing-wing 26 is divided into two portions. In the upper portions 261, 262 of the swing-wing 26 the edges 47E, 47E' of the inducing wings 45, 46 are arranged at 90° C. to each other. In the lower portion 49, 263 of the swing-wing 26 the edges 47E", 47E''' of the 45, 46 are arranged at 180° (parallel) to each other. Thus, if the angular relationship between the upper portions 261, 262 and the lower portions 49, 263 can be changed, the layout of the whole inducing wings 45, 46 can be varied. In the embodiment, the edges 47E", 47E''' are disposed centrally between the edge 47E and the edge 47E'. FIG. 10C shows a modified embodiment, which illustrates the swing-wing 26 without the phantom (dummy) wing set 49.

Figure 11:
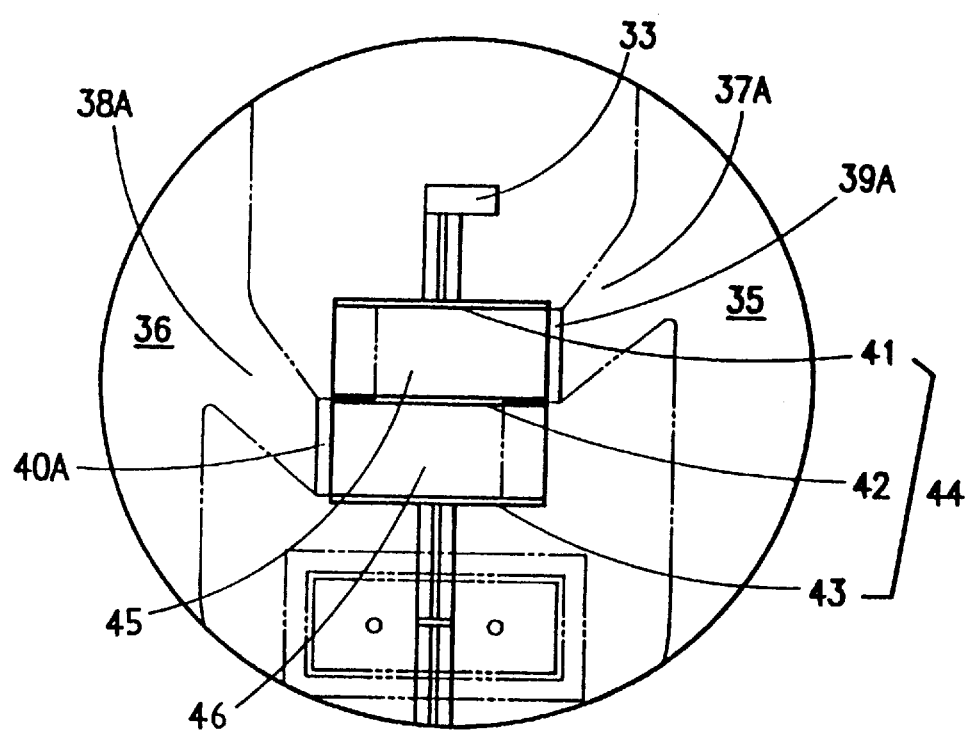
FIG. 11 is a schematic view showing an arrangement of the swing-wing system and the discharging openings.

As explained earlier, the respective distributing wings 47 are placed in front of the corresponding openings 16, and the position of the dividing plate 44 and the openings 16 correspond with the partitioned space between the shelves 8 of the refrigerating compartment 3. FIG. 11 shows that the swing-wing 26 is disposed in front of the front plate 24. The middle plate 42 of the dividing plate 44 is disposed at the border between the first discharging portion 39A and the second discharging portion 40A. The upper plate 41 is disposed above the middle plate 42 by a distance equal to the height of the first discharging portion 39A, while the lower plate 43 is disposed beneath the middle plate 42 by a distance equal to the height of the second discharging portion 40A. The upper 41, the middle and lower plates 42, 43 have the same diameter. The diameter approximately equals the width of the opening 16 so as to prevent the cool air leakage. The space defined by the upper plate 41, the middle plate 42 and the first discharging portion 39A forms an individual rotating passage with the help of the duct extended from the branch duct 37A. Also, the space defined by the middle plate 42, the lower plate 43 and the second discharging portion 40A forms another individual rotating passage with the help of the duct extended from the branch duct 38A. The individual rotating passages help to discharge the air forward in the refrigerating compartment without the air descending. It keeps the weak air discharged in approximately a horizontal direction into the refrigerating compartment even when the swing wing is in the slow rotation mode.

Figure 12:
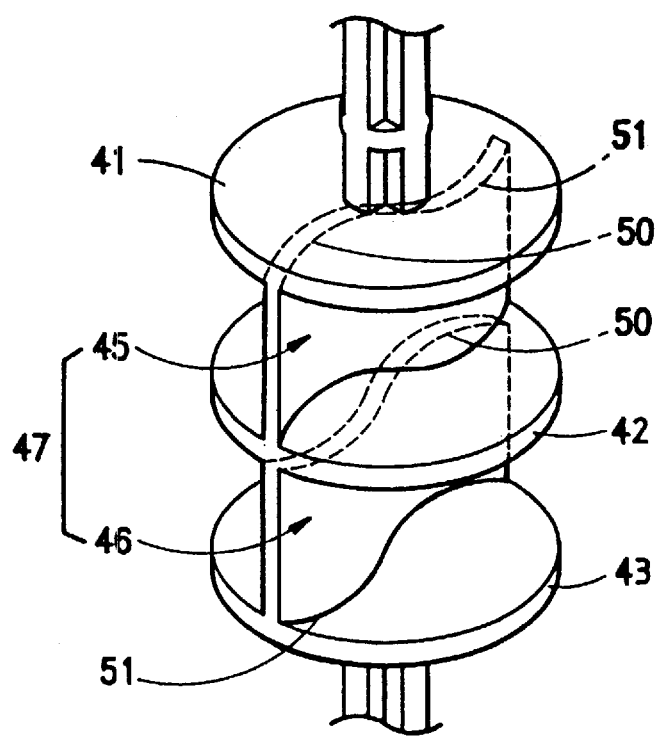
FIG. 12 is a partially cutaway perspective view of the swing-wing system of FIG. 10A.

Further, the first inducing wing 45 and the second inducing wing 46 are disposed symmetrically with respect to the shaft as shown in FIG. 12. In more detail, the inducing wings 45, 46 are provided with a concave portion 50 and a convex portion 51 which are rounded in series, respectively. That is, the concave portion 50 and the convex portion 51 are smoothly connected to be formed in a "S" shape. Thus, the air is smoothly discharged along the first and second inducing wings 45, 46 through the opening 16. The first inducing wing 45 has a different position with respect to the second inducing wing 46. The concave portion 50 of the first inducing wing 45 is reversely positioned with respect to the convex portion 51 of the second inducing wing 46, while the convex portion 51 of the first inducing wing 45 is reversely positioned with respect to the concave portion 50 of the second inducing wing 46. The disposition of the inducing wings 45, 46 is for reducing the flow resistance, corresponding to the disposition of the first and second discharging portions 39A, 40A. The air guided by the inducing wings 45, 46 impinges on the convex portion 51 largely, and flows over the convex portion 51, thereby remarkably reducing the flow resistance. When the vertical center line Y—Y of the first distributing portion 39A is disposed toward the first branch duct 37A with respect to the vertical center line X—X of the opening 16A as shown in FIG. 9B, the convex portion 51 of the first distributing wing 45 is disposed slightly to the right side of the opening 16A. Alternatively, when the vertical center line Z—Z of the second distributing portion 40A is disposed toward the second branch duct 38A with respect to the vertical center line X—X of the opening 16A as shown in FIG. 9B, the convex portion 51 of the second distributing wing 46 is disposed slightly to the left side of the opening 16A. Thus, the air guided through the first branch duct 37A at the right side flows onto the convex portion 51 of the first inducing wing 45, while the air guided through the second branch duct 38A at the left side flows onto the convex portion 51 of the second distributing wing 46, which develops a main flow.

As to the forementioned disclosure (FIGS. 10A, 10B and 10C), assuming that the edge 47E of the upper wing member 261 is a basis, the edge 47E' of the middle wing member 262 is offset by about 90°, and the edge 47E", of the lower wing member 263 is offset by about 45°. Since the upper, the middle and the lower distributing wings 261, 262, 263 are arranged in a different angular position relative to each other, the impinging point and the discharging direction onto/from the distributing wing 47 of the cool air varies, thereby causing the load applied to the distributing wing 47 to diminish. If the edges 47E, 47E', 47E", 47E''' of the inducing wings 45, 46 were instead aligned, the cool air discharged from the different rotating position would impinge onto the distributing wing in the same direction, causing excessive load on the swing-wing. In the embodiment, the angular positions of the arrangement of the distributing wing sets are different from each other and the problem of excessive load can not occur.

The edges 47E, 47E', 47E''' are disposed within a range of about 90° independent of the rotating position of the swing-wing 26. At the same time, the other edges are disposed within a range of about 90° at the opposite side.

FIG. 10D illustrates another embodiment of the swing-wing 26'. The concave portion 50 of the first inducing wing 45' is disposed in the same position with respect to the concave portion 50 of the second inducing wing 46'. Further, the convex portion 51 of the first inducing wing 45' is disposed in the same position as with respect to the convex portion 51 of the second distributing wing 46'.

FIG. 10E shows another embodiment of the swing-wing 26w. The swing-wing 26w comprises a columnar member 26b extended up and down, and a distributing wing 26s which is disposed at the columnar member 26b in an eccentric manner and is formed like an oval in a cross-section.

Figure 13:
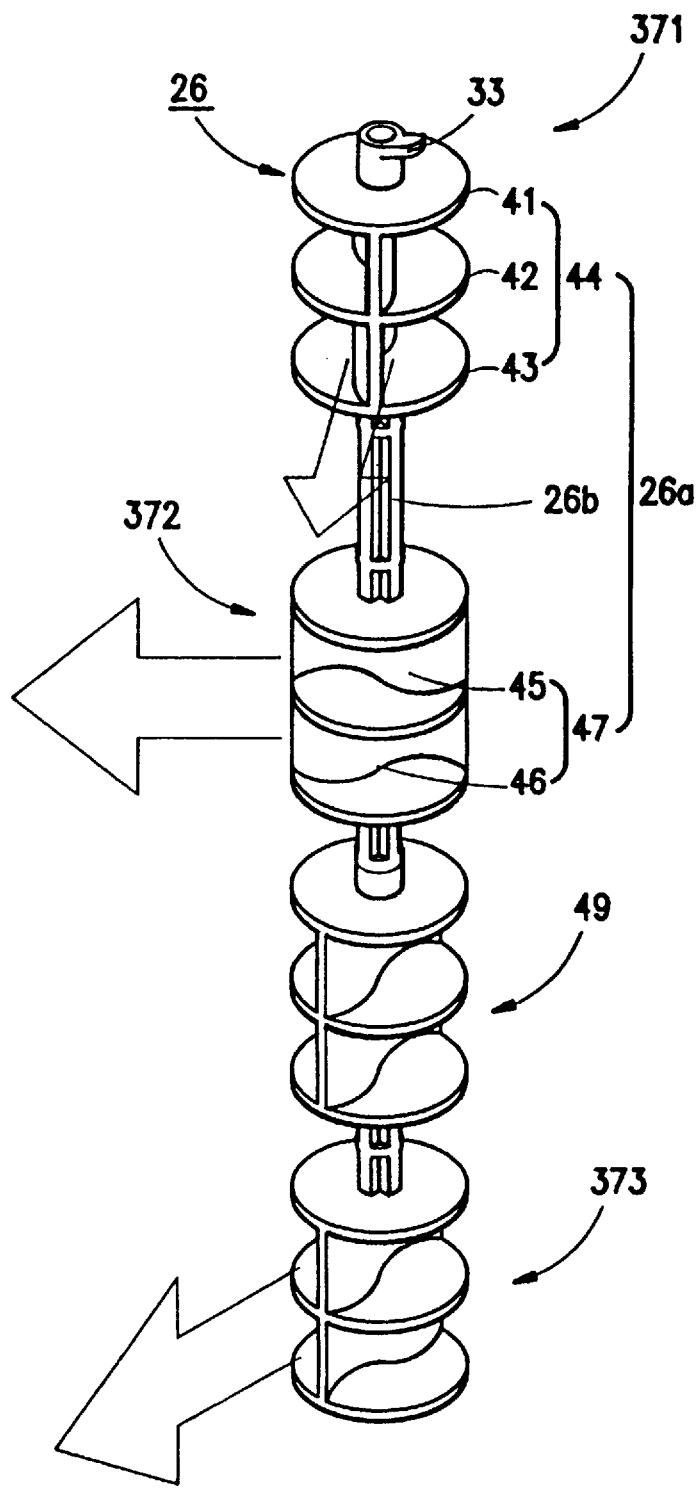
FIG. 13 is a view showing the swing-wing system when in a left side localized cooling position.
Figure 14:
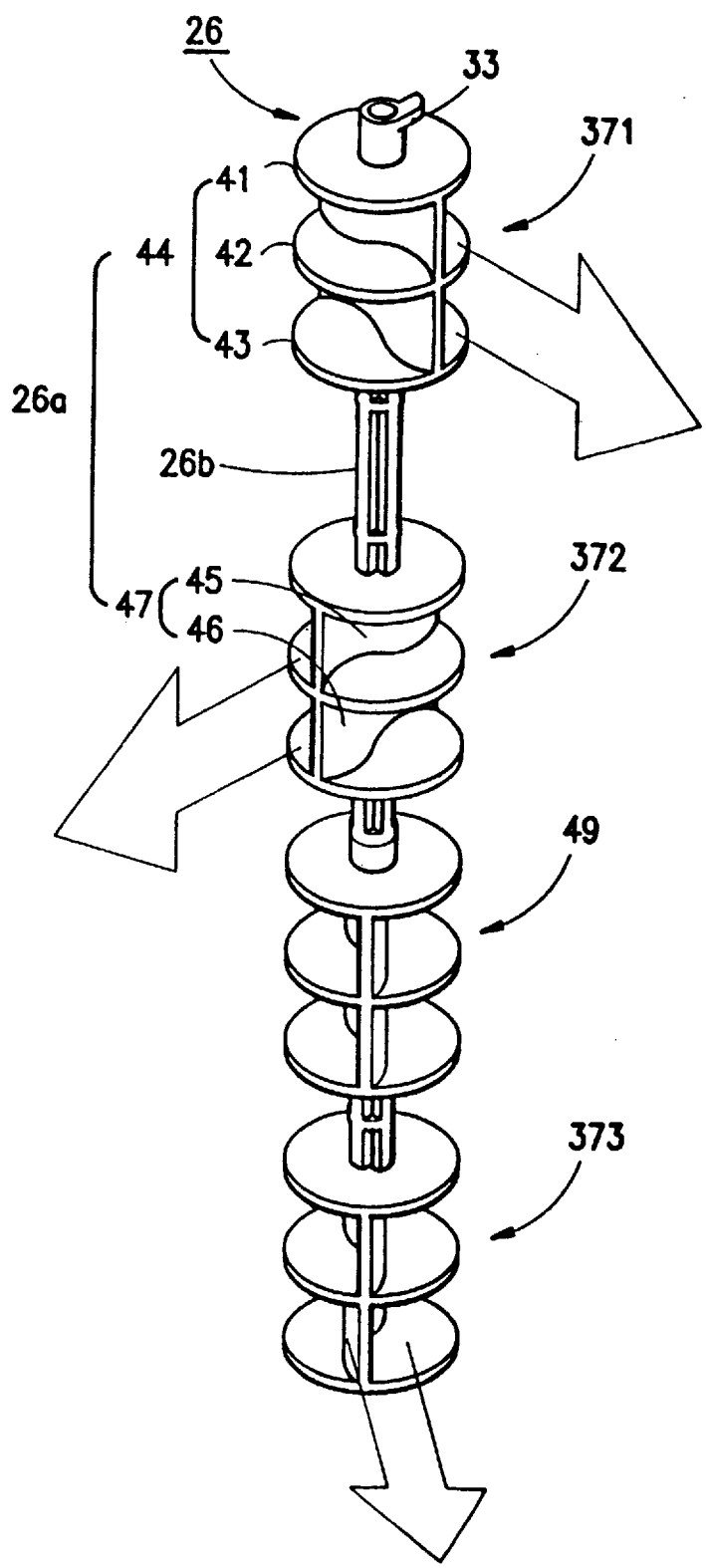
FIG. 14 is a view showing the swing-wing system when in a central area localized cooling position.
Figure 15:
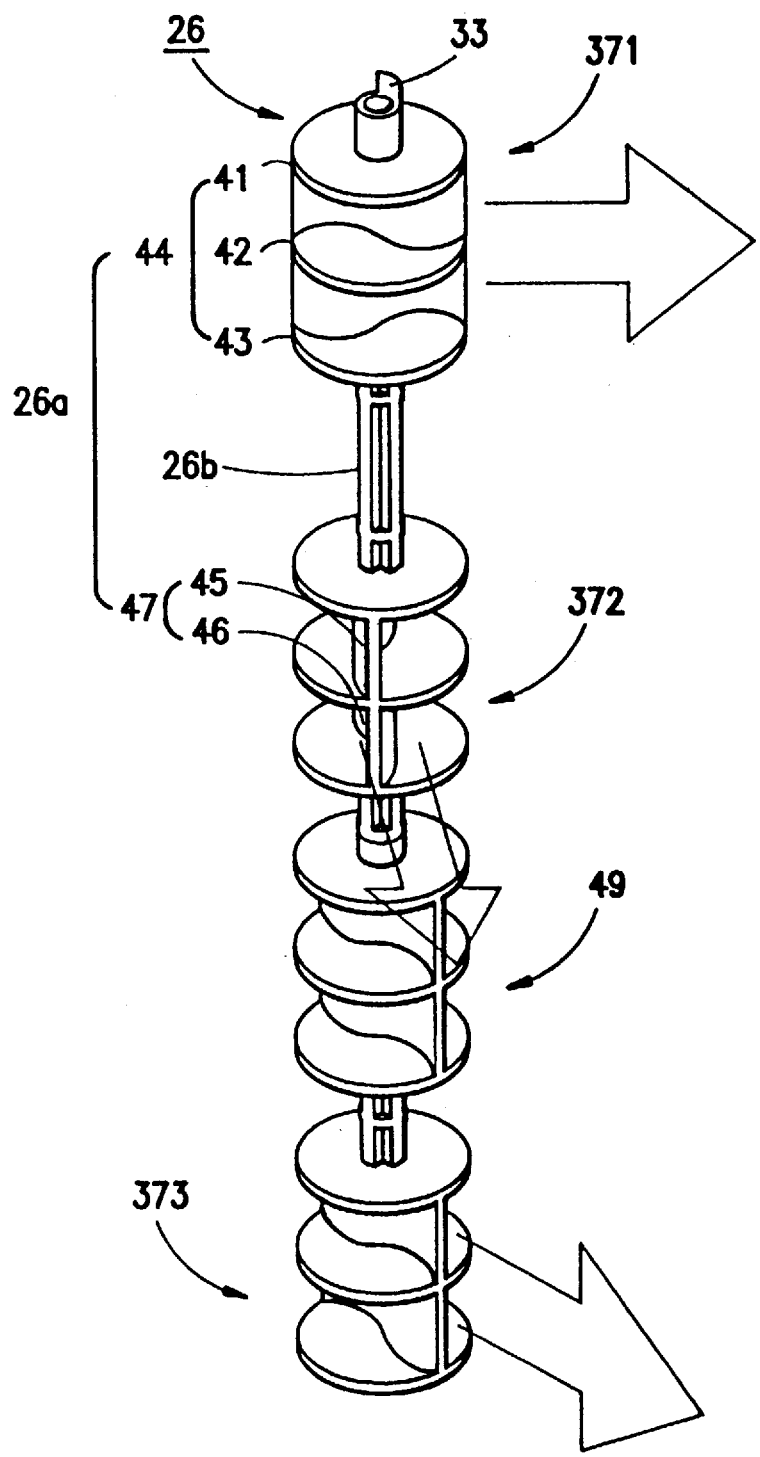
FIG. 15 is a view showing the swing-wing system when in a right side localized cooling position.

Using the various embodiments of the swing-wing, a left-side, center and right-side concentrated cooling can be achieved. FIG. 13 shows the state of left-side concentrated cooling, FIG. 14 shows the central concentrated cooling, and FIG. 15 shows the right-side concentrated cooling. The concentrated cooling can be achieved by aiming the air flow toward a predetermined direction under the command of the control system, as well as the above-mentioned three directions.

Figure 16:
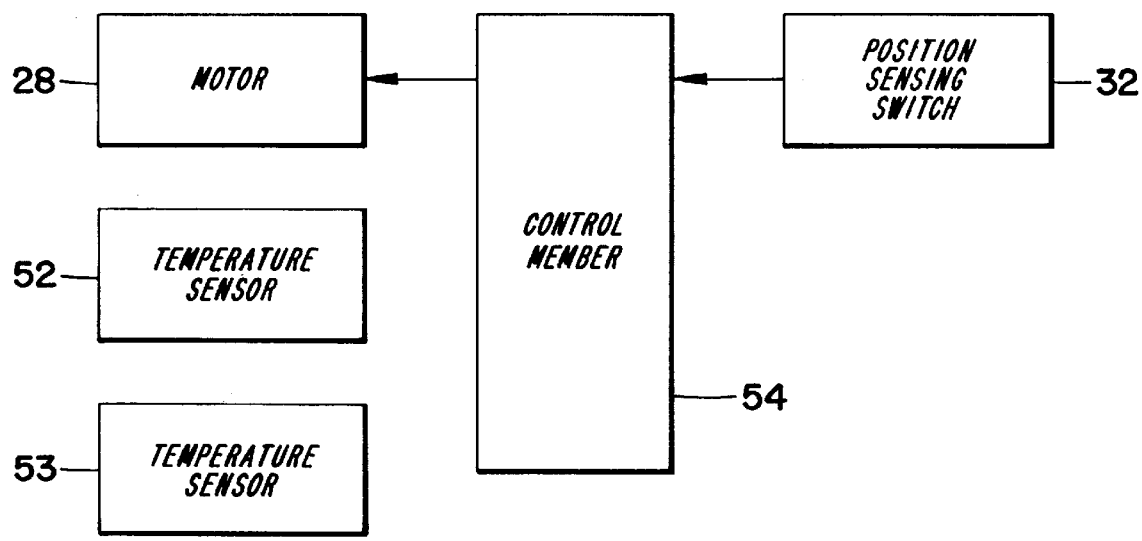
FIG. 16 is a block diagram showing an electrical configuration of a control apparatus used in a refrigerator.

To determine the direction of the concentrated cooling, a right space or first temperature sensor 52 is installed at the upper central portion of the right wall of the refrigerating compartment 3 and a left space or second temperature sensor 53 is installed at the lower central portion of the left wall of the refrigerating compartment 3 as shown in FIG. 5. The temperature sensors 52, 53 as well as the position sensing switch 32 (FIG. 6) are connected to a control member 54 as shown if in FIG. 16. Further, the motor 28 for rotating the swing-wing 26 is connected to the control member 54. These components can detect the temperature variance in the refrigerating compartment to achieve the effective concentrated cooling.

Figure 17A:
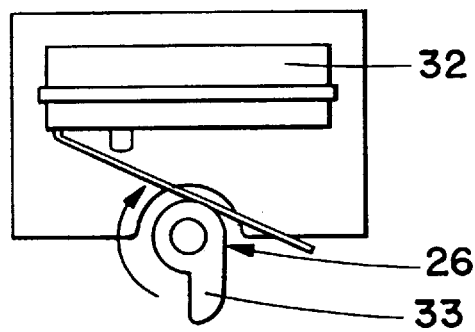
FIGS. 17A, 17B, 17C are operating views of a position sensing switch adapted to a cool air distribution apparatus.
Figure 17B:
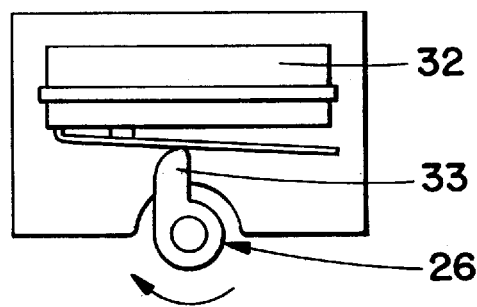
Figure 17C:
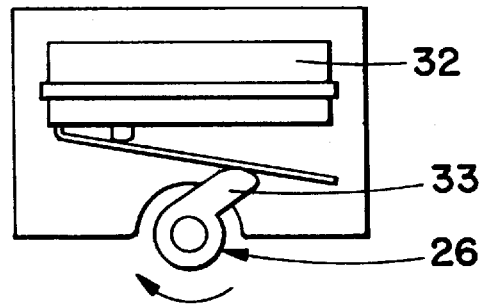

FIG. 17 illustrates the state of the operation of the position sensing switch 32 which determines the datum position of the swing-wing 26, and the protuberance 33 which is rotated against the position sensing switch 32. The protuberance 33 rotates in the arrow direction together with swing-wing 26 so as to be operated as shown in FIGS. 17A, 17B, 17C. FIG. 17C shows the moment that the sensing switch 32 is deactuated, which regards the datum position of the swing-wing in the embodiment. The protuberance is configured in a smooth rounded manner for preventing any noise generated by the sudden release of the switch.

The operation of the above-described refrigerator will now be explained with reference to the attached drawings.

First, the compressor 11 and the evaporator 12 are operated and cool air is generated by the heat-exchange with the circumference of the evaporator 12. The cool air is moved into the freezing compartment 2 and the refrigerating compartment 3 by the fan 3 along the direction of the arrow. Depending on the temperature of the refrigerating compartment 3 the shutting/opening operation of the baffle plate 19 (FIG. 8) is controlled. As the baffle plate 19 is opened, the cool air from the evaporator 12 is fed into the air passage 18 as shown in FIG. 9A, and the air is divided between the right and the left sides of the upper portion of the air distributing-apparatus 17. A part of the cool air is discharged into the third compartment 9 through the air discharge opening 23 (FIG. 5), while most of the cool air is discharged into the refrigerating compartment 3 and the vegetable compartment 10 after flowing along the first duct 35 and the second duct 36.

In FIGS. 9A and 9B, the air flowing along the ducts 35, 36 is guided by the respective branch ducts so as to be discharged through the openings 16 in sequence from the upper to the lower openings 16. Further, the air through the openings is distributed horizontally by the rotation of the swing-wing 26. Even without the swing-wing 26, since the opening 16 comprises the first discharging portion 39 and the second discharging portion 40, in which one is located over the other and the respective discharging portions are eccentrically formed relative to the center line of the opening 16 to receive the air, then the air can be distributed to the right or the left. Further, by adding the swing-wing, a more effective distribution of the air can be achieved, which generates a uniform cooling of the refrigerating compartment. In the embodiment, the swing-wing 26 is operated by a geared motor at a constant speed, in which the rotating speed is 6 to 10 rpm. The geared motor can also be replaced by a stepping motor which has a variable rotating speed it so desired.

In more detail, the air through the respective discharging portions is blown in a different direction relative to each other and is smoothly distributed in the refrigerating compartment. For instance, the air guided toward the first discharging portion 39A is aimed toward the left side of FIG. 9B, whereas the air guided toward the second discharging portion 40A is aimed toward the right side of FIG. 9B. Further, at the adjacent opening 16B, the position of the discharging portions 39B, 40B is reversed with respect to that of the discharging portions 39A, 40A. Since air flowing-down along the ducts 35, 36 has a progressively increasing temperature, air flowing from the right side 37A of the upper opening 16A, air has a lower temperature than that of the left side 38A. Contrarily, at the middle opening 16B, the air having a lower temperature than that of the right side 37B flows from the left side 38B. Next, at the lower opening 16C, the air having a lower temperature than that of the left side 38C flows from the right side 37C. Thus, a uniform temperature in the refrigerating compartment is accomplished to eliminate the temperature deviation of the right side and the left side in the refrigerating compartment.

Because the middle shoulder 372 is outwardly extended more than the upper shoulder 371, and the lower shoulder 373 is outwardly extended more than the middle shoulder 372, the warmer air which by-passes the upper branch ducts 37A, 38A is discharged in a greater volume through the middle branch ducts 373, 38B with respect to the air volume through the upper branch ducts 37A, 38A. Also, more volume of yet warmer air is discharged through the lower branch ducts 37C, 38C with respect to the air volume through the middle branch ducts 37B, 38B. Therefore, the temperature deviation with respect to the height of the refrigerating compartment is diminished, thereby accomplishing uniform cooling from the upper portion through the lower portion of the refrigerating compartment.

Even when in the stationary state of the swing-wing, the discharged air can be distributed and volumetrically controlled. Further, during rotation of the swing-wing, a more effective distribution can be accomplished to achieve a higher quality of uniform cooling.

However, if too much foodstuffs or a relatively hot food is disposed in a specific area of the refrigerator, the uniform cooling is disrupted, and even during rotation of the swing-wing, it is difficult to maintain uniform cooling. To solve the problem, a concentrated cooling to the specified area needs to be employed. The operation of the concentrated cooling will be explained with reference to FIGS. 13, 14 and 15.

When concentrated cooling is required for the left side, the swing-wing 26 is temporarily fixed in a state directed toward the left direction so that the major part of the cool air flow is headed toward the left side as shown in FIG. 13. The respective air flow from the upper 371, the middle 372 and the lower wing set 373 is discharged in the left direction within 90° from each other. Further, when concentrated cooling is required to the center area, the swing-wing 26 is temporarily fixed in the central direction so that the major part of the cool air flow is headed toward the central area as shown in FIG. 14. The respective air flow from the upper 371, the middle 372 and the lower wing set 373 is discharged in the center direction within 90° from each other. Furthermore, when the concentrated cooling is required for the right side, the swing-wing 26 is temporarily fixed toward the right direction so that the major part of the cool air flow is headed toward the right side as shown in FIG. 15. The respective air flow from the upper 371, the middle 372 and the lower wing set 373 is discharged in the right direction within 90° from each other.

The rotation degree of the swing-wing 26 is controlled by the control member 54 and the position sensing switch 32 which is turned "on/off" by the protuberance 33 of the swing-wing 26. In the embodiment, the time when the protuberance 33 is released from the position sensing switch 32 is set as the datum time (FIG. 17C). The control member 54 checks the period of the rotation of the swing-wing, thereby producing the degree of the rotation. For example, assuming that the rotation speed of the swing-wing 26 is 6 rpm, the swing-wing 26 rotates for 10 seconds from the datum point, thereby rotating one turn.

Figure 18:
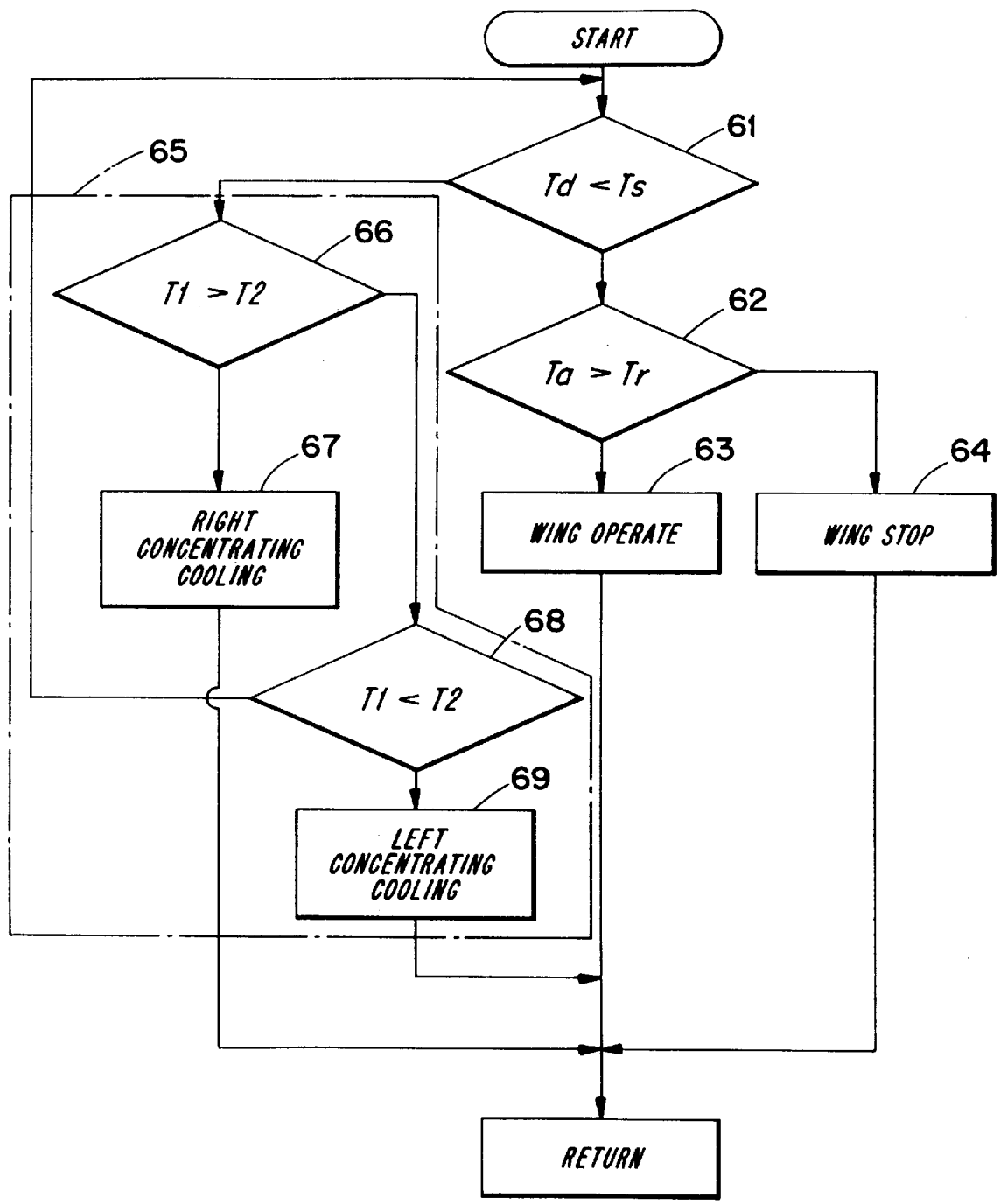
FIG. 18 is a flow chart showing a control method adapted to a refrigerator.

Referring to FIG. 18 illustrating the even cooling and the concentrated cooling according to a control method of the invention, it is firstly judged at step 61 whether the temperature is higher than a previous set (reference) temperature in a refrigerating compartment, but at that time the temperature deviation is usually 2° C. in this embodiment. In order to calculate the temperature deviation, this embodiment comprises a right space temperature sensor 52 mounted on the right upper center of the refrigerating compartment 3 and a left space temperature sensor 52 mounted on the left lower center of the refrigerating compartment 3 which are separated at an optimum distance from each other so as to detect the temperatures accurately, in which the difference between the temperatures detected by two sensors is called "a temperature deviation". Of course, it will be more preferable to obtain the temperature deviation which is the difference between the maximum temperature and the minimum temperature detected by using a plurality of sensors.

Subsequently, if the temperature deviation Td is smaller than the set deviation temperature Ts, step 62 determines an average temperature from the temperatures detected by the right space temperature sensor 52 and the left space temperature sensor 53, and then determines whether the average temperature Ta is higher than the datum temperature Tr. If the average temperature Ta is higher than the datum temperature Tr, step 62 proceeds to step 63 to turn on a driving motor 28 for operating the swing-wing 26. On the contrary, if the average temperature Ta is lower than the datum temperature Td, step 62 goes to step 64 to turn off the driving motor 28 for stopping the operation of the swing-wing 26. Herein, the datum temperature is determined at around 3° C. which is maintained for the proper storage of foodstuffs in the refrigerating compartment 3. Therefore, it is noted that the conditions of the temperature deviation below the set deviation temperature and the average temperature below the datum temperature are caused by the uniform cooling of the invention.

On the other hand, if the temperature deviation Td is higher than the set deviation temperature Ts at step 61, control processes routine 65 performs a concentrated cooling. In other words, it is determined at step 66 whether the detected temperature of the right space temperature sensor 52 is lower than the detected temperature of the left space temperature sensor 53. If the right sensor's temperature T1 is higher than the left sensor's temperature T2, step 67 performs the right concentrated cooling. On the contrary, if it is determined at step 68 that the left sensor's temperature T2 is higher than the right sensor's temperature T1, step 69 performs the left concentrated cooling.

Herein, the left concentrated cooling is performed by adjusting the positional angle of the swing-wing so as to force the main flow of cooling air to be concentrated toward the left side. For example, if the swing-wing 26 is rotated at the constant speed of 6 RPM, when the swing-wing 26 is rotated for a period of 1.25 second starting from the datum time point, it is rotated by 45° to perform the left concentrated cooling. Then, if it is determined at step 68 that the right sensor's temperature T1 is higher than the left sensor's temperature T2, it returns to step 61. Similarly, during the right concentrated cooling the swing-wing 26 is rotated for a time period of 3.75 seconds starting from the datum time point to perform the right concentrated cooling.

The performing of the right or left concentrated cooling is continued for a predetermined period. When the temperature deviation is over the set deviation temperature, the concentrated cooling continues to be performed in the trial and error manner so that the area requiring the concentrated cooling is detected and the positional angle of the swing-wing 26 is adjusted. For example, if the temperature deviation is higher than the set deviation temperature, and the right sensor's temperature is higher than the left sensor's temperature, the swing-wing 26 is rotated for a predetermined period to detect the area required for the concentrated cooling, thereafter performing the concentration cooling, again. The initial concentrated cooling may be focused on the area of the sensor detecting the higher temperature, or on an arbitrary area, i.e. the area spacedly before the area to be called for the concentrated cooling.

As described in detail above, a refrigerator according to this invention can achieve uniform refrigeration because the cool air introduced to the cool air duct is evenly distributed throughout the refrigerating compartment because of the design of the rear plate and the arrangement of the cool air discharge openings. The uniform refrigeration can be done more effectively by means of the swing wing which disperses the discharged cool air.

In the case that there is any temperature deviation in the compartment, the area with a relatively high temperature can receive the concentrating cooling for some period until the uniform temperature is reached. Accordingly, this invention possesses the advantage of achieving the concentrating cooling in any case.

Further, the housing of this invention has a compact and slim structure because the cool air passages are formed at both sides of the cool air discharge openings and the swing wing is placed just in the cool air discharge openings, so that the reduction of the storing space is prevented.

The assembling and disassembling of this invention are very easy because this invention consists of several parts capable of being assembled and disassembled in the housing such as the motor, the indoor lamps, and the swing-wing.

The rotating vanes consist of a two-piece structure, so molding process is easy and replacement is convenient.

Also, motor trouble can be prevented because the motor is placed on the swing-wing and the indoor lamps are mounted near the motor, so that the motor is free from moisture penetration.

In addition, even if the swing-wing rotates slowly, with the assistance of the vane portions of plate-type positioned at the cool air discharge openings, the cool air is discharged toward the compartment without flowing down along the cool air passages.

What is claimed is:

1. A refrigerator comprising:
   a body partitioned into a freezing compartment and a refrigerating compartment;
   an evaporator disposed in said body for generating cool air; and an air distribution apparatus disposed on one wall of said refrigerating compartment and including:
 a row of vertically spaced openings for conducting cool air toward said refrigerating compartment;
 first and second horizontally spaced vertical ducts straddling said row of openings, upper ends of said vertical ducts receiving a downward flow of cool air from said evaporator;
 each of said openings being connected to said first and second vertical ducts by first and second branch ducts, respectively.

2. The refrigerator according to claim 1 wherein each of said openings is connected to its associated first and second branch ducts at different respective elevations.

3. The refrigerator according to claim 1, further including vertically spaced shelves in said refrigerating compartment to divide said refrigerating compartment into a plurality of vertically adjacent sections, said openings disposed in respective ones of said sections.

4. The refrigerator in accordance with claim 3 wherein each branch duct includes vertically spaced upper and lower walls, said upper wall including a rounded corner intersecting a respecting vertical duct, said lower wall including a sharper corner intersecting a respective vertical duct.

5. The refrigerator according to claim 4 wherein each of said relatively sharp corners extends horizontally outwardly from its respective opening by a greater distance than said rounded corner, each relatively sharp corner extending farther horizontally from its respective opening than a relatively sharp corner of an opening disposed thereabove.

6. A refrigerator according to claim 1, further comprising a swing wing mounted on said one wall, said swing wing including vanes disposed across respective ones of said openings at an orientation for directing the travel of air emerging from said openings, said swing wing being mounted for rotation about a vertical axis; and a motor connected to said swing wing for rotating said swing wing to vary the orientation of said vanes.

7. The refrigerator according to claim 6 wherein said swing wing comprises a plurality of vertically spaced sets of wing members disposed at respective ones of said openings, each set of wing members comprising an upper horizontal plate, a middle horizontal plate, and a lower horizontal plate, an upper vertical vane interconnecting said upper and middle plates, and a lower vertical vane interconnecting said middle and lower plates.

8. The refrigerator according to claim 6 wherein each vane is oval-shaped.

9. The refrigerator according to claim 7 wherein each vane is wave-shaped, including horizontally adjacent concave and convex portions.

10. The refrigerator according to claim 9 wherein the concave portion of each upper vane is disposed directly vertically above a convex portion of its associated lower vane.

11. The refrigerator according to claim 9 wherein the concave portion of each upper vane is disposed directly above a concave portion of its associated lower vane.

12. The refrigerator according to claim 6 wherein said openings comprise upper and lower openings and a middle opening disposed between said upper and lower openings, said vane of said upper opening being fixed within a ninety degree angle of rotation with respect to said vane of said middle opening, and within a forty-five degree angle of said vane of said lower vane.

13. The refrigerator according to claim 6, wherein said refrigerating compartment includes opposing side walls, and a first temperature sensor disposed at an upper portion of one of said side walls, and a second temperature sensor disposed at a lower portion of the other side wall, a sensing switch for sensing an angular rotational position of said swing-wing, and a control member connected to said temperature sensors and said motor for rotating said swing-wing in response to temperatures sensed by said first and second temperature sensors to tend to produce a uniform temperature in said refrigerating compartment.

14. The refrigerator according to claim 13 wherein said swing wing includes a protuberance rotatable with said swing-wing and arranged to engage said switch.

15. The refrigerator according to claim 7 wherein said sets of wing members comprises upper, lower, and middle wing members, said vane of said upper wing member being fixed within a ninety degree angle of rotation with respect to said vane of said middle wing member, and within a forty-five degree angle with respect to said lower wing member.

16. The refrigerator according to claim 15 wherein said upper wing member is disposed at a level corresponding to about ¾ of the height of said refrigerating compartment; said middle wing member disposed at a level corresponding to about ½ of the height of said refrigerating compartment; said lower wing member disposed at a level corresponding to about ⅓ of the height of said refrigerating compartment.

17. The refrigerator according to claim 1 wherein said refrigerating compartment includes a rear wall having a recess therein, said air distributing apparatus disposed in said recess, and a front plate converting said recess and disposed substantially flush with said rear wall.

18. The refrigerator according to claim 17 further including a seal plate disposed between a rear wall to said air distributing apparatus and a rear wall of said recess.

19. The refrigerator according to claim 6 further including a grill overlying a front portion of said air distribution apparatus, said swing wing disposed immediately rearwardly of said grill.

20. A refrigerator comprising:
 a food storage compartment including a rear wall; and
 an air distribution apparatus mounted on said rear wall and including:
  an upright air passage for conducting a flow of cool air,
  a plurality of vertically spaced openings communicating said air passage with said compartment,
  a swing wing comprising vertically spaced vanes, each vane disposed in path of cool air flow from a respective one of said openings for directing said flow, said swing wing being rotatable by 360° degrees to vary the orientations of said vanes, and
  a motor connected to said swing wing for rotating said swing wing.

21. The refrigerator according to claim 20 further including a position sensing switch for sensing a rotational position of said swing wing, and a protuberance on said swing wing for rotation therewith and arranged to operate said sensing switch.

22. The refrigerator according to claim 20 including lamps disposed adjacent said motor.

23. The refrigerator according to claim 20 further including a pair of horizontal plates disposed above and below each of said vanes.

24. The refrigerator according to claim 23 wherein said air passage comprises first and second vertical passages straddling said openings.

25. The refrigerator according to claim 20 wherein said air passage comprises first and second vertical passages straddling said openings; said air distribution apparatus further including a grill disposed in front of said swing wing.

26. A refrigerator comprising:

a food storage compartment including a rear wall; and an air distribution apparatus mounted on said rear wall and including:

an upright air passage for conducting a flow of cool air,
 a plurality of vertically spaced openings communicating said air passage with said compartment, said air passage comprising first and second vertical passages straddling said openings, a swing wing comprising vertically spaced vanes, each vane disposed in path of cool air flow from a respective one of said openings for directing said flow, said swing wing being rotatable to vary the orientations of said vanes, and a motor connected to said swing wing for rotating said swing wing.

* * * * *